(12) United States Patent
Mosko

(10) Patent No.: US 12,284,216 B2
(45) Date of Patent: Apr. 22, 2025

(54) SYSTEM AND METHOD FOR SYNTHESIZING ROLE-BASED ACCESS CONTROL ASSIGNMENTS PER A POLICY

(71) Applicant: Palo Alto Research Center Incorporated, Palo Alto, CA (US)

(72) Inventor: Marc E. Mosko, Kensington, CA (US)

(73) Assignee: Xerox Corporation, Norwalk, CT (US)

( * ) Notice: Subject to any disclaimer, the term of this patent is extended or adjusted under 35 U.S.C. 154(b) by 329 days.

(21) Appl. No.: 17/900,774

(22) Filed: Aug. 31, 2022

(65) Prior Publication Data

US 2023/0086475 A1  Mar. 23, 2023

Related U.S. Application Data

(60) Provisional application No. 63/245,344, filed on Sep. 17, 2021.

(51) Int. Cl.
*H04L 9/40* (2022.01)

(52) U.S. Cl.
CPC ............ *H04L 63/20* (2013.01); *H04L 63/104* (2013.01); *H04L 63/105* (2013.01)

(58) Field of Classification Search
CPC ...... H04L 63/20; H04L 63/104; H04L 63/105
See application file for complete search history.

(56) References Cited

U.S. PATENT DOCUMENTS 6,742,128 B1  5/2004  Joiner
7,013,395 B1  3/2006  Swiler
(Continued)

FOREIGN PATENT DOCUMENTS

CN   106991325 A   7/2017
CN   106997437 A   8/2017
(Continued)

OTHER PUBLICATIONS

Albanese, M., & Jajodia, S. (2017). A Graphical Model to Assess the Impact of Multi-Step Attacks. The Journal of Defense Modeling and Simulation. 79-93.
(Continued)

*Primary Examiner* — Christopher B Robinson
*Assistant Examiner* — Tania M Pena-Santana

(57) ABSTRACT

A system and method are provided to facilitate securing windows discretionary access control. During operation, the system determines a Windows domain model including: user-specified desired effective permissions as capability assignments of principals on resources, wherein a respective capability assignment comprises a permission of a respective principal to a respective resource and wherein a respective principal comprises a user or a group of users; and user-specified policies and rules for relationships between principals, groups, and resources. The system creates a domain graph and an access control graph based on the Windows domain model. The domain graph maps paths between nodes representing users, groups, and resources based on the policies and rules. The access control graph allows for calculation of actual permissions of principals on resources based on the desired effective permissions. The system determines a set of optimal policy-conformant configurations based on the domain graph and the access control graph.

18 Claims, 22 Drawing Sheets

(56) References Cited

U.S. PATENT DOCUMENTS

| | | | |
|---|---|---|---|
| 9,215,158 B1 | 12/2015 | Adogla | |
| 9,317,692 B2 | 4/2016 | Elder | |
| 9,684,865 B1 | 6/2017 | Ezick | |
| 9,705,978 B1 | 7/2017 | Kenigsberg | |
| 10,313,382 B2 | 6/2019 | Noel | |
| RE47,757 E | 12/2019 | Hering | |
| 10,516,761 B1 | 12/2019 | A | |
| 10,601,854 B2 | 3/2020 | Lokamathe | |
| 10,771,489 B1 | 9/2020 | Bisht | |
| 10,812,499 B2 | 10/2020 | Hassanzadeh | |
| 10,904,270 B2 | 1/2021 | Muddu | |
| 11,265,292 B1 | 3/2022 | Leviseur | |
| 11,675,503 B1* | 6/2023 | Ekins | G06F 3/0637 |
| | | | 711/163 |
| 2004/0128544 A1* | 7/2004 | Hondo | H04L 63/0823 |
| | | | 726/8 |
| 2006/0089932 A1* | 4/2006 | Buehler | G06F 21/6218 |
| | | | 707/999.009 |
| 2008/0104665 A1 | 5/2008 | Naldurg | |
| 2008/0172716 A1 | 7/2008 | Talpade | |
| 2009/0077666 A1 | 3/2009 | Chen | |
| 2009/0265199 A1 | 10/2009 | Moerdler | |
| 2010/0095381 A1 | 4/2010 | Levi | |
| 2010/0192195 A1 | 7/2010 | Dunagan | |
| 2013/0232331 A1 | 9/2013 | Farhan | |
| 2015/0058993 A1 | 2/2015 | Choi | |
| 2015/0244734 A1 | 8/2015 | Olson | |
| 2016/0050116 A1 | 2/2016 | Sheshadri | |
| 2016/0205122 A1 | 7/2016 | Bassett | |
| 2017/0034023 A1 | 2/2017 | Nickolov | |
| 2017/0177740 A1 | 6/2017 | Abaya | |
| 2017/0195349 A1 | 7/2017 | Shabtai | |
| 2017/0286690 A1 | 10/2017 | Chari | |
| 2017/0289187 A1 | 10/2017 | Noel | |
| 2017/0324768 A1 | 11/2017 | Crabtree | |
| 2018/0210927 A1 | 7/2018 | Karam | |
| 2018/0322407 A1 | 11/2018 | Baum | |
| 2019/0098039 A1 | 3/2019 | Gates | |
| 2019/0362087 A1* | 11/2019 | Ferrans | H04L 63/102 |
| 2020/0053116 A1 | 2/2020 | Soroush | |
| 2020/0110774 A1 | 4/2020 | Lakshmanan | |
| 2020/0137104 A1 | 4/2020 | Hassanzadeh | |
| 2020/0167705 A1 | 5/2020 | Risoldi | |
| 2020/0175174 A1 | 6/2020 | Bakalli | |
| 2020/0177608 A1 | 6/2020 | Okunlola | |
| 2020/0177615 A1 | 6/2020 | Grabois | |
| 2020/0177617 A1 | 6/2020 | Hadar | |
| 2020/0177618 A1 | 6/2020 | Hassanzadeh | |
| 2020/0244691 A1 | 7/2020 | Veeramany | |
| 2020/0311630 A1 | 10/2020 | Risoldi | |
| 2020/0412758 A1 | 12/2020 | Trivellato | |
| 2021/0012012 A1 | 1/2021 | Soroush | |
| 2021/0014065 A1 | 1/2021 | Gourisetti | |
| 2021/0014264 A1 | 1/2021 | Soroush | |
| 2021/0014265 A1 | 1/2021 | Hadar | |
| 2021/0409439 A1 | 12/2021 | Engelberg | |
| 2022/0014534 A1 | 1/2022 | Basovskiy | |
| 2022/0075546 A1* | 3/2022 | Potyraj | G06F 9/5072 |
| 2022/0191230 A1 | 6/2022 | Morgan | |
| 2022/0263860 A1 | 8/2022 | Crabtree | |
| 2022/0321658 A1* | 10/2022 | Goodman | H04L 67/306 |

FOREIGN PATENT DOCUMENTS

| | | |
|---|---|---|
| CN | 107038380 A | 8/2017 |
| CN | 107066256 A | 8/2017 |
| CN | 108123962 A | 6/2018 |
| CN | 110138788 A | 8/2019 |
| CN | 110188871 A | 8/2019 |
| CN | 110191120 A | 8/2019 |
| CN | 111611586 A | 9/2020 |
| CN | 112766374 A | 5/2021 |
| KR | 102079970 B1 | 4/2020 |
| WO | 0070463 A1 | 11/2000 |
| WO | 2007143226 A2 | 12/2007 |
| WO | 2019186722 A1 | 10/2019 |

OTHER PUBLICATIONS

Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.

Bahl, P., Barham, P., & Black, R. (2006). Discovering Dependencies for Network Management. ACM HotNets.

BeyondTrust. (2018). Retina. Retrieved from Retina: https://www.beyondtrust.com/products/retina-network-security-scanner/.

CyVision. (2018). CyVision. Retrieved from CyVision: https://www.cyvisiontechnologies.com/.

GraphX. (2018). GraphX. Retrieved from GraphX: https://spark.apache.org/graphx/.

Leversage, D., & Byres, E. (2008). Estimating a system's mean time-to-compromise. IEEE Security & Privacy, 52-60.

Mitre. (2018). CVE. Retrieved from CVE: https://cve.mitre.org/.

MSR. (2018). Z3 Guide. Retrieved from Z3 Guide: https://rise4fun.com/z3/tutorialcontent/guide#h23.

Natarajan, A., Ning, P., Liu, Y., Jajodia, S., & Hutchinson, S. (2012). NSDMiner: Automated Discovery of Network Service Dependencies. IEEE INFOCOM.

NIST. (2018). Retrieved form https://nvd.nist.gov/.

OMG. (Mar. 2015). Data Distribution Service Specification Version 1.4. Retrieved from OMG DDS: https://www.omg.org/spec/DDS/About-DDS/.

RTI. (2017). RTI Routing Service. Retrieved from RTI Routing Service: https://rti.com/products/dds/routing-service.html.

SANS. (2002). SANS Institute, "Quantitative Risk Analysis Step-By-Step". Retrieved from Quantitative Risk Analysis Step-by-Step: https://www.sans.org/reading-room/whitepapers/auditing/quantitative-risk-analysis-step-by-step-849.

Schrecker, S., Soroush, H., & Molina, J. (2016). "Industrial Internet of Things vol. G4: Security Framework",. CreateSpace Independent Publishing Platform.

Soroush, H., Irey, P., & Pardo-Castellote, G. (2015). Next-Generation Cybersecurity for Advanced Real-Time Distributed Systems. Intelligent Ships Symposium.

StackOverflow. (2018). StackOverflow. Retrieved from StackOverflow: https://stackflow.com/.

Tenable. (2018). Nessus. Retrieved from Nessus: https://www.tenable.com/products/nessus/nessus-professional.

Venkatesan, S., Albanese, M., & Jajodia, S. (2015). Distributing Stealthy Botnets through Strategic Placement of Detectors. IEEE Conference on Communications and Network Security (IEEE CNS).

Venkatesan, S., Albanese, M., Cybenko, G., & Jajodia, S. (2016). A Moving Target Defense Approach to Disrupting Stealthy Botnets. ACM Workshop on Moving Target Defense (MTD).

Welsh, M. (2013). What I Wish System Researchers Would Work On. Retrieved from http://matt-welsh.blogspot.com/2013/05/what-i-wish-systems-researchers-would.html.

Xu, Tu., & Zhou, Y. (2015). Systems Approaches to Tackling Configuration Errors: A Survey. ACM Comput. Surv.

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).

Brigitte Boden, Mining Coherent Subgraphs in Multi-Layer Graphs with Edge Labels, Data Management and Data Exploration Group RWTH Aachen University, Germany, Proceedings of the 18th ACM SIGKDD international conference on Knowledge discovery and data mining, Aug. 2012 pp. 1258-1266 (Year: 2012).

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A , 12 pages (Year: 2021).

\* cited by examiner

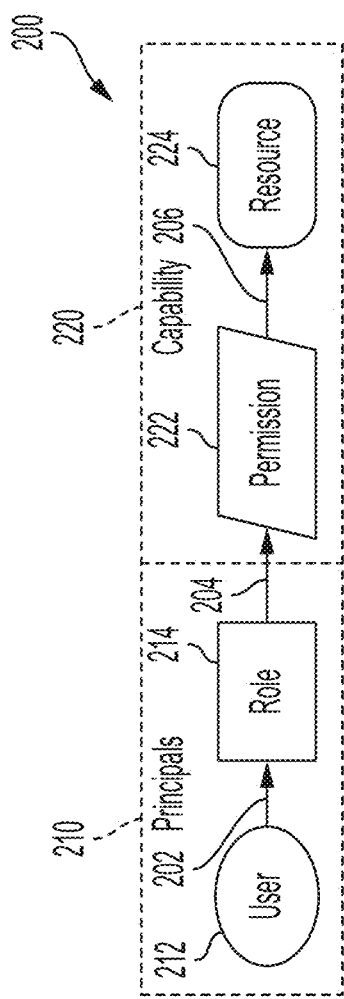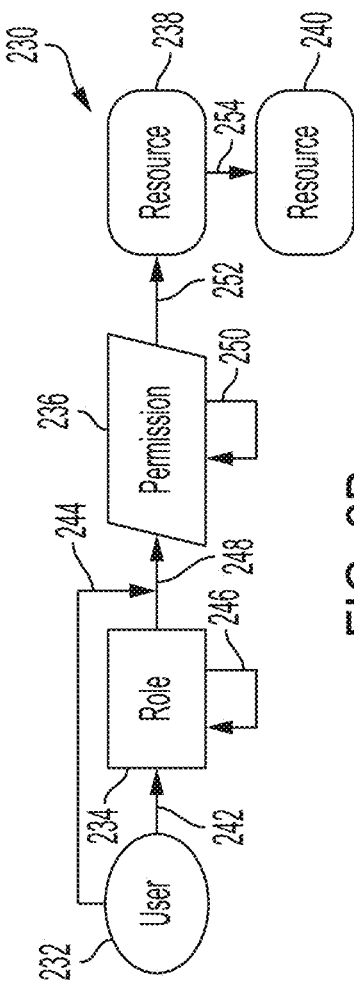

```
{
  "domains" : [""],
  "computers" : [""],
  "users" : [""],
  "trust_relations" : [{"domain":"", "trusted": [""]}],
  "roles" : [""],
  "memberships" : [{"roles" : "", "members": [""]}],
  "privileged" : [""],
  "unauthenticated_principals": [""],
  "permissions": [""],
  "effective_perms" : [{ "permission" : "", "implies":[""]}],
  "resource_types": [""],
  "resource_permissions": [{ "type": "", "permissions": [""]}],
  "resources": [{ "name": "", "domain_name": "", "type": "", "target": ""}],
  "resource_containment": [{ "container": "", "contains": [""]}],
  "capability_assignments": [
        {"principal": "",
         "capabilities": [{ "permission": "", "resource": "" }]}
}
```

FIG. 7B

```
"capability_assignments": [
    {
        "principal": "LM-NAWS01\\Administrators",
        "capabilities": [
        { "permission": "login", "resource": "LM-NAWS01" }]
    },
    {
        "principal": "LM\\alice",
        "capabilities": [
        { "permission": "install", "resource": "LM-DC01" },
        { "permission": "read", "resource": "LM-DC01:E:\\Shares\\
            HRPolicies"}]
    }]
```

SYSTEM AND METHOD FOR SYNTHESIZING ROLE-BASED ACCESS CONTROL ASSIGNMENTS PER A POLICY

RELATED APPLICATIONS

This application claims the benefit of U.S. Provisional Application No. 63/245,344, titled "System and Method for Synthesizing Role-Based Access Control Assignments Per a Policy," by inventor Marc E. Mosko, filed 17 Sep. 2021 (hereinafter "U.S. patent application Ser. No. 63/245,344"), the disclosure of which is incorporated herein by reference in its entirety.

This application is related to U.S. application Ser. No. 17/900,458, titled "System and Method for Securing Windows Discretionary Access Control," by inventor Marc E. Mosko, filed 31 Aug. 2022 (hereinafter "U.S. patent application Ser. No. 17/900,458"), the disclosure of which is incorporated herein by reference in its entirety.

This application is further related to:
U.S. patent application Ser. No. 16/219,774 entitled "Method for Improving the Security of a Networked System by Adjusting the Configuration Parameters of the System Components," by inventors Hamed Soroush and Shantanu Rane, filed 13 Dec. 2018 and issued 1 Jun. 2021 as U.S. Pat. No. 11,025,661 (hereinafter "U.S. Pat. No. 11,025,661"), which application claims the benefit of
U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to
U.S. patent application Ser. No. 16/918,971 entitled "System and Method for Constructing a Graph-Based Model for Optimizing the Security Posture of a Composed Internet of Things System," by inventors Hamed Soroush, Milad Asgari Mehrabadi, Shantanu Rane, and Massimiliano Albanese, filed 1 Jul. 2020 (hereinafter "U.S. patent application Ser. No. 16/918,971"); and
U.S. patent application Ser. No. 16/923,763 entitled "System and Method for Reasoning About the Optimality of a Configuration Parameter of a Distributed System," by inventors Hamed Soroush and Shantanu Rane, filed 8 Jul. 2020 (hereinafter "U.S. patent application Ser. No. 16/923,763"); the disclosures of which are herein incorporated by reference in their entirety.

STATEMENT OF GOVERNMENT-FUNDED RESEARCH

This invention was made with U.S. government support under (Contract Number) Award Number: FA8750-18-0147 awarded by the Defense Advanced Research Projects Agency (DARPA) of the Department of Defense (DoD). The U.S. government has certain rights in the invention.

BACKGROUND

Field

This disclosure is generally related to Windows discretionary access control. More specifically, it is related to a system and method for synthesizing role-based access control (RBAC) assignments per a policy.

Related Art

Currently, SCIBORG uses information representing system components, parameters, and interdependencies in a multi-layer graph to determine a configuration for a system. The multi-layer graph can include a dependency graph, a vulnerability graph, and a configuration graph. The determined configuration can optimize the functionality, security, and utility of the system while minimizing the impact of vulnerabilities to the system (e.g., damage from attackers).

The Windows Role-Based Access Control Model (RBAC) model can be used in various Windows subsystems, including the file system, registry keys, group policy objects, printing, etc. Each subsystem can include a set of resources (e.g., files and directories, registry keys, or printers) as well as a set of permissions on those resources. The RBAC model can allow an administrator to assign zero or more Access Control Entries (ACEs) to each resource. An ACE for a resource can specify the security principal (usually a user or a group), the permission, and whether the permission is allowed or denied. Windows can use an algorithm to compute a principal's effective permissions by looking at the order and contents of each ACE entry. Computing the effective rights of a specific principal on a resource can involve evaluating user, group membership, and inherited permissions until a deny or allow result is reached. This computation must be performed for each resource and each permission. Due to the interaction of deny and allow permissions via nested groups, inheritance, or blocked inheritance, an administrator may encounter challenges in understanding what the resulting effective right may be upon changing memberships, group permissions, or user permissions.

SUMMARY

A system and method are provided to facilitate synthesizing role-based access control (RBAC) assignments per a policy. During operation, the system determines a Windows domain model including: user-specified desired effective permissions as capability assignments of principals on resources, wherein the principals comprises users or groups of users, and wherein a capability assignment comprises a permission of a principal to a resource; and user-specified policies and rules for relationships between the principals and the resources. The system creates a domain graph and an access control graph based on the Windows domain model, wherein the domain graph maps paths between nodes representing the users, groups, and resources based on the policies and rules, and wherein the access control graph allows for calculation of actual permissions of the principals on the resources based on the desired effective permissions. The system determines a set of optimal policy-conformant configurations based on the mapped paths from the domain graph and the calculated actual permissions from the access control graph.

In some embodiments, the domain graph comprises: a plurality of nodes which represent at least one of the users, the groups of users, and the resources; and a plurality of directed edges between the nodes. A first directed edge from a respective user or a first group in a first domain to a second group in the first domain indicates an intra-domain membership relation. A second directed edge from the respective user or the first group in the first domain to a third group in a second domain indicates an inter-domain membership relation. A third directed edge from the respective user or the first group in the first domain to a first resource in the first domain indicates an intra-domain permission relation. A fourth directed edge from the respective user or the first group in the first domain to a second resource in the second domain indicates an inter-domain permission relation. A fifth directed edge from the first resource in the first domain to a third resource indicates an inheritance relation.

In some embodiments, each directed edge is associated with a user-assigned weight indicated in the policies and rules. Determining the set of optimal policy-conformant configurations based on the mapped paths from the domain graph further comprises calculating a least cost path from a respective user node to a respective resource node in the domain graph based on the user-assigned weight for each directed edge.

In some embodiments, the access control graph comprises: a plurality of nodes which represent at least one of the users, the groups of users, assigned permissions, actual permissions, and the resources; and a plurality of directed edges between the nodes. A first directed edge from a respective user or a first group to a second group indicates a membership relation. A second directed edge from the respective user or the first group to a first assigned permission indicates an allow or deny permission relation. A third directed edge from the first assigned permission to an actual permission indicates an implies relation. A fourth directed edge from the actual permission to a first resource indicates an applies relation. A fifth directed edge from the first assigned permission to a second assigned permission indicates an inherits relation.

In some embodiments, a cost of 0 is associated with each of: the first directed edge indicating the membership relation; and the third directed edge indicating the implies relation. A cost of 1 is associated with each of: the second directed edge indicating the allow or deny permission relation; the fourth directed edge indicating the applies relation; and the fifth directed edge indicating the inherits relation.

In some embodiments, the system determines the set of optimal policy-conformant configurations based on the calculated actual permissions from the access control graph by the following operations. For a given user node and a given resource node, the system applies a shortest path calculation between the given user node and the given resource node, by performing the following operations. The system determines whether a deny path exists. The system determines whether an allow path exists. Responsive to determining that the deny path does not exist and the allow path does exist, the system generates a result of an allow permission for the given user node on the given resource node.

In some embodiments, responsive to determining that the deny path does exist and the allow path does exist, the system performs the following operations. The system calculates a first cost of the deny path based on a cost associated with each directed edge in the deny path between the given user node and the given resource node. The system calculates a second cost of the allow path based on a cost associated with each directed edge in the allow path between the given user node and the given resource node. Responsive to the first cost being less than or equal to the second cost, the system generates a result of a deny permission for the given user node on the given resource node. Responsive to the first cost being greater than the second cost, the system generates a result of an allow permission for the given user node on the given resource node.

In some embodiments, the set of optimal policy-conformant configurations comprise access control entries for the respective principal to the respective resource and group memberships indicating which users belong to which groups.

In some embodiments, the user-specified desired effective permissions are included in a scenario file and the user-specified policies and rules are included in a policy file. The system transmits, to a python role-based access control (RBAC) module, the scenario file, the policy file, and other input files describing the Windows domain model for processing, which results in creating the domain graph and the access control graph. Determining the set of optimal policy-conformant configurations based on the mapped paths from the domain graph and the calculated actual permissions from the access control graph further comprises generating a multi-layer graph. The system applies a process on the multi-layer graph to obtain a recommended configuration, wherein the process applies operational and security constraints to the multi-layer graph. The system generates, based on the recommended configuration, a report comprising at least one of: choices made by the system in selecting the recommended configuration, including prioritization of a first constraint over a second constraint; a description of capabilities assigned to users and resources; and a description of group memberships.

BRIEF DESCRIPTION OF THE FIGURES

FIG. 2A illustrates a basic RBAC model, in accordance with an embodiment of the present application.

FIG. 2B shows an enhanced RBAC model, in accordance with an embodiment of the present application.

FIG. 7B depicts an exemplary specification file in JSON format referenced from a scenario file, in accordance with an embodiment of the present application.

FIG. 7E depicts exemplary capability assignments from a specification file, in accordance with an embodiment of the present application.

In the figures, like reference numerals refer to the same figure elements.

DETAILED DESCRIPTION

Figure 1:
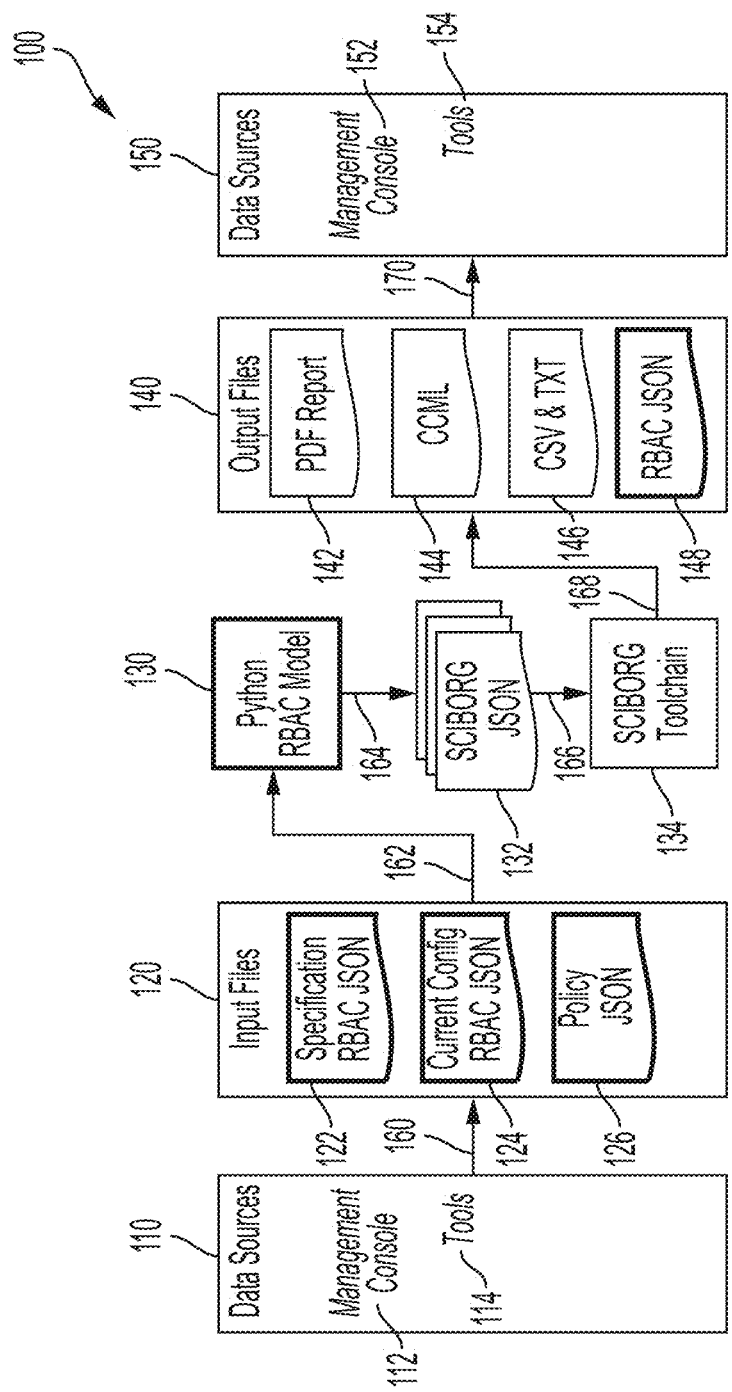
FIG. 1 illustrates an exemplary environment which facilitates synthesizing RBAC assignments per a policy, including as part of the current SCIBORG system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview of Application of SCIBORG to Windows RBAC Model

The embodiments described herein provide a system which allows an administrator to specify the final effective permissions for each user on each resource (e.g., in a Windows-based system) and which subsequently determines the "local" allow/deny permissions on specific resources as well as group memberships. The system can determine the local allow/deny permissions and the group memberships based on the construction of a domain graph and an access control graph. Based on these two graphs, the system can select the best policy-conformant paths and generate the SCIBORG multi-layer graph.

The Windows Role-Based Access Control Model (RBAC) model can be used in various Windows subsystems, including the file system, registry keys, group policy objects, printing, etc. Each subsystem can include a set of resources (e.g., files and directories, registry keys, or printers) as well as a set of permissions on those resources. Such permissions may vary from subsystem to subsystem. For example, even if the name is the same (e.g., "Read"), the semantic meaning may vary.

The RBAC model can allow an administrator to assign zero or more Access Control Entries (ACEs) to each resource. An ACE for a resource can specify the security principal (usually a user or a group), the permission, and whether the permission is allowed or denied. The resource itself can be implicit in the ACE entry, as the ACE entry is stored on the resource itself. Windows can use an algorithm to compute a principal's effective permissions by looking at the order and contents of each ACE entry. If the principal of an ACE entry is a group, the ACE entry can apply to all (possibly nested) members of the group.

Computing the effective rights of a specific principal on a resource can involve evaluating user, group membership, and inherited permissions until a deny or allow result is reached. This computation must be performed for each resource and each permission. Due to the interaction of deny and allow permissions via nested groups, inheritance, or blocked inheritance, an administrator may encounter challenges in understanding what the resulting effective right may be upon changing memberships, group permissions, or user permissions.

The described embodiments address these challenges by providing a system which allows an administrator to specify the final effective permissions for each user on each resource (e.g., in a Windows-based system) and which subsequently calculates "local" allow/deny permissions on specific resources and group memberships. To simplify the process of specifying the final effective permissions, the system allows the administrator to use groups, group memberships, and group permissions in a specification (e.g., in a specification portion of a scenario file, as described below in relation to FIGS. 7A and 7B). The system also allows the administrator to use "notional" or shorthand roles in the specification solely for the sake of convenience, i.e., without having those notional roles translate into configured groups or group memberships.

As described above, the current RBAC model allows an administrator to assign ACE entries to each resource, where an ACE for a resource can specify the security principal (usually a user or a group), the permission, and whether the permission is allowed or denied. Windows can use an algorithm to compute a principal's effective permissions, by inspecting the order and contents of each ACE entry.

In the described embodiments, the system can use an equivalent but different framing of ACE entries. A "capability" can be defined as a specification permission on a specific resource, and principals can be denied or allowed a respective capability. That is, in a Windows domain model with capability assignments of principals on resources, a respective capability assignment can include a permission of a respective principal to a respective resource, and a respective principal can include a user or a group of users (as described below in relation to FIGS. 2A and 2B).

Furthermore, Windows RBAC can allow for the inheritance of capabilities. For example, if resources have a hierarchical structure, ACE entries made a higher level may inherit to their children. Windows RBAC can also allow an administrator to block inheritance between specific parent-child links. Moreover, not all resources have inheritable permissions (e.g., printer resources generally do not have any children).

The described embodiments can determine a Windows domain model, which can include user-specified desired effective permissions as capability assignments of principals on resources. A respective capability assignment can include a permission of a respective principal to a respective resource, and a respective principal can include a user or a group of users (as described below in relation to the scenario file, specification file, and capability assignments of FIGS. 7A, 7B, and 7E). The Windows domain model may also include user-specified policies and rules for relationships between principals, groups, and resources (as described below in relation to the policy file and rules of FIGS. 7C and 7D).

The described embodiments can ingest the domains and systems (e.g., the Windows domain model as RBAC JavaScript Object Notation (JSON)-formatted files) and construct a domain graph and an access control graph. The domain graph can map possible paths between nodes based on the user-specified policies and rules contained in the policy file. Exemplary domain graphs are described below in relation to FIGS. 8A and 8B. The access control graph can calculate "actual" permissions (e.g., corresponding to access control entries) based on the user-specified desired effective permissions contained in the scenario file. Exemplary access control graphs with actual permission calculations are described below in relation to FIGS. 9A, 9B, and 9C.

Based on the mapped paths of the domain graph and the calculated actual permissions of the access control graph, the described embodiments can select the best policy-conformant paths and generate the SCIBORG multi-layer graph. The system can further apply operational and security constraints to the multi-layer graph, apply SCIBORG to the multi-layer graph, and generate reports and recommended configurations, as described below in relation to FIG. 1 and U.S. Pat. No. 11,025,661.

FIG. 1 illustrates an exemplary environment 100 for facilitating Windows discretionary access control, including as part of the current SCIBORG system, in accordance with an embodiment of the present application. Data sources 110 can include a management console 112 and tools 114. Data sources 110 can provide information for the generation or creation of input files 120 (via a communication 160). Input files 120 can include one or more Javascript Object Notation (JSON) files, e.g., a single scenario JSON file (as in FIG. 7A) which references one or more other JSON files, including at least: a specification RBAC JSON 122; a current configuration RBAC JSON 124; and a policy JSON 126. Input files 120 can describe the RBAC configuration and desired properties. Input files 120 can be sent to and processed or ingested by a Python RBAC model 130 (via a communication 162). Python RBAC model 130 can generate a SCIBORG JSON 132, which can include and specify the multi-layer graph (as described in U.S. Pat. No. 11,025,661). That is, Python RBAC model 130 can translate from the JSON-formatted input files 120 to SCIBORG JSON files (via a communication 164). The generation of the multi-layer graph can further be based on the domain graph and the access control graph (which can be created based on the ingested input files 120). Python RBAC model 130 can use the domain graph, the access control graph, and other information from ingested input files 120 to synthesize the logic required to generate the multi-layer graph.

A SCIBORG toolchain 134 can receive and further process the multi-layer graph (via a communication 166). For example, a reasoner component can execute against a Neo4j database by solving the multi-layer graph given conflicts, by selecting certain constraints for relaxing, and by balancing the utility of the components with the severity of the vulnerabilities (as described in U.S. patent application Ser. No. 16/923,763). SCIBORG toolchain 134 (including the Reasoner component) can execute the testbed generated by the Python code (generated by Python RBAC Model 130) and can also generate output files 140 (via a communication 168). Output files 140 can include, but are not limited to: a PDF report 142; a CCML 144; a CSV and TXT file 146; and an RBAC JSON 148. Output files 140 may be sent to data sources 150 (via a communication 170), for an extra post-processing step to translate between the encoded symbolic names used in SCIBORG back to the real-world names used in the original RBAC specification. For example, data source 150 can include data to be displayed on a management console 152 and to be manipulated, viewed, accessed, or processed by tools 154.

As described herein, the described embodiments (e.g., the SCIBORG RBAC Model and solver) can enforce a set of rules which will always be held true, including:
1. A security domain trusts itself.
2. A role may contain a user from a trusted domain.
3. A role may contain a role from a trusted domain.
4. A capability may be assigned to a user or a role from a trusted domain.
5. A permission may imply one or more other permissions on the same resource.
6. A resource exists in a single security domain.
7. All permissions on a resource are in the same security domain as the resource.
8. A resource has a specific type
9. A resource may contain another resource of the same type, within the same domain.
10. A role cannot be a member of itself.
11. Role memberships do not form cycles.
12. Resource containment does not form cycles.
13. A capability assigned to a role inherits to all members.
14. A permission assigned to a resource inherits to all contained resources.

The described embodiments can include an engine (e.g., the solver) which configures security and can: add or remove users from roles; add or remove roles from roles; and assign capabilities to users or roles. The solver cannot create new users, roles, or capabilities.

The described embodiments can support several types of security policies. These policies can affect how the solver assigns users to roles and capabilities to principals. For example, in an Active Directory (AD) tree, one policy may prefer to put users in groups in their local domain, then use those groups for inter-domain memberships. Another policy may require that a capability only be assigned to groups in the same domain, and never directly to a principal outside the domain.

The described system can represent these types of policies via a cost function that depends upon the pair-wise relationship of the entities. The cost function can also prohibit a relationship entirely. The policies can also include a few rules about what is or is not allowed. These rules can be defined by flags and hard-coded in the model. In some embodiments, a modular plug-in expression language may be used to allow a user to write Python or similar predicates to test object attributes.

RBAC Overview; Exemplary ACE Creation Workflow; Challenges Due to Complicated Permissions FIG. 2A illustrates a basic RBAC model 200, in accordance with an embodiment of the present application. A user may be in zero or more roles, and a role may contain zero or more users. Roles may have capabilities, where a capability is an assignment of a specific permission on a specific resource. Permissions can be specific to resources. For example, file system resources may have permissions like read, write, delete, list, and execute, while a computer resource may have permissions like install software, debug programs, or use the USB port. As another example, Active Directory Organizational Units may have permissions like delegate or manage. An exemplary diagram of registry key permissions is described below in relation to FIG. 4.

In basic RBAC model 200, a user 212 can have a role 214 (or be associated with or be a member of a group 214) (via a relation 202). A role 214 can have a permission 222 (via a relation 204) on a particular resource 224 (via a relation 206). For example, a user "Alice" may be in the Engineering role, and the Engineering role may have read and write permissions to a specific shared folder.

The described embodiments can use an enhanced RBAC model. FIG. 2B shows an enhanced RBAC model 230, in accordance with an embodiment of the present application. In enhanced RBAC model 230, a capability may be assigned directly to a user, roles may be nested, a permission may imply other permissions, and resources may contain other resources. Nested roles may imply capability inheritance. For example, if Alice is in the Engineering role and Engineering is in the Product Development role, any capabilities assigned to Product Development are inherited to both Engineering and Alice. Furthermore, in some systems, the write permission may imply the read permission, and the execute permission may imply the read permission.

In enhanced RBAC model 230, a user 232 can have a role 234 (or be associated with or be a member of a group 234) (via a relation 242). Roles or groups can be nested, i.e., a role or group can be a member of another role or group (via a relation 246). User 232 or role 234 (via, respectively, relations 244 and 248) can have a permission 236 on a resource 238 (via a relation 252). Permission 236 can imply other permissions (via a relation 250), and permissions can also be inherited or blocked. Resource 238 can contain other resources, including a resource 240 (via a relation 254), such as directories, registry keys, and Group Policy Objects (GPOs). An example of nested groups and contained resources is described below in relation to FIG. 3.

Furthermore, varying trust relationships may exist between users and group of the same or a different domain. For example, if a trust relationship exists from a domain A to a domain B (i.e., domain A trusts domain B), then users and groups of domain B can be used inside domain A (i.e., as if they were inside domain A). In addition, the system may includes many different resource types, such as file systems, ADs, registry keys, etc., where each resource type may have its own set of permissions and where some permissions may imply other permissions, as depicted below in relation to FIG. 4.

Figure 3:
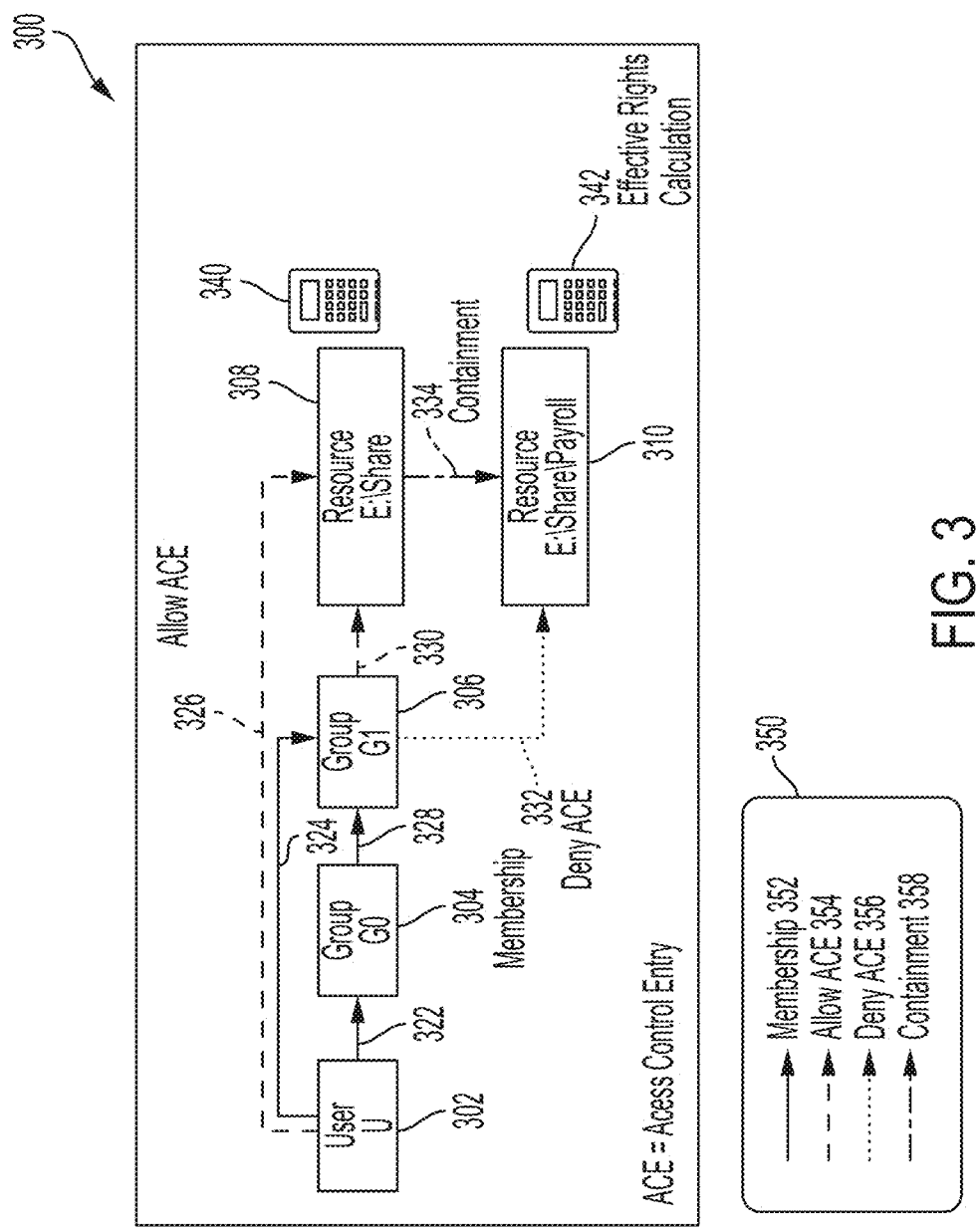
FIG. 3 illustrates an exemplary ACE creation workflow, in accordance with an embodiment of the present application.

FIG. 3 illustrates an exemplary ACE creation workflow 300, in accordance with an embodiment of the present application. An index 350 can indicate various types of relations between entities in workflow 300, e.g.: a solid-line arrow can represent a membership relation 352; a dashed-line arrow can represent an allow ACE relation 354; a dotted-line arrow can represent a deny ACE relation 356; and a dotted/dashed-line arrow can represent a containment relation 358.

As described above, users can belong to groups, groups can belong to groups, and resource can contain other resources. Workflow 300 can include a user U 302 which belongs to, is associated with, or is a member of a group G0 304 (via a membership relation 322) and a group G1 306 (via a membership relation 324). Group G0 304 can be a member of group G1 306 (via a membership relation 328). A resource 308 ("E:\Share") can contain a resource 310 ("E:\Share\Payroll") (via a containment relation 334).

A user or a group may have a direct allow or deny permission on a given resource. For example, user U 302 can have an allow ACE permission to resource 308 (via an allow relation 326). Group G1 306 may also have an allow ACE permission to resource 308 (via an allow relation 330). Group G1 306 may have a deny ACE permission to resource 310 (via a deny relation 332). Current RBAC models may perform effective rights calculations 340 and 342 for, respectively, resources 308 and 310. As described above, computing or calculating the effective rights of each principal on each resource can involve a complex process of evaluating user, group membership, and inherited permissions until reaching a deny or allow result. Because of the interaction between deny and allow permissions via nested groups, inheritance, or blocked inheritance, it may be challenging for an administrator to determine or understand the impact of changing memberships or group or user permissions on the effective rights.

The Windows domain model may include a structure with multiple domains, users, groups, resource, and permissions, where groups can be nested, permissions can be inherited (as described below in relation to FIG. 4) or blocked, resources can contain other resources (as described above in relation to FIGS. 2B and 3), and varying trust relationships may exist between users and group of the same or a different domain (as described below in relation to FIG. 7F).

Figure 4:
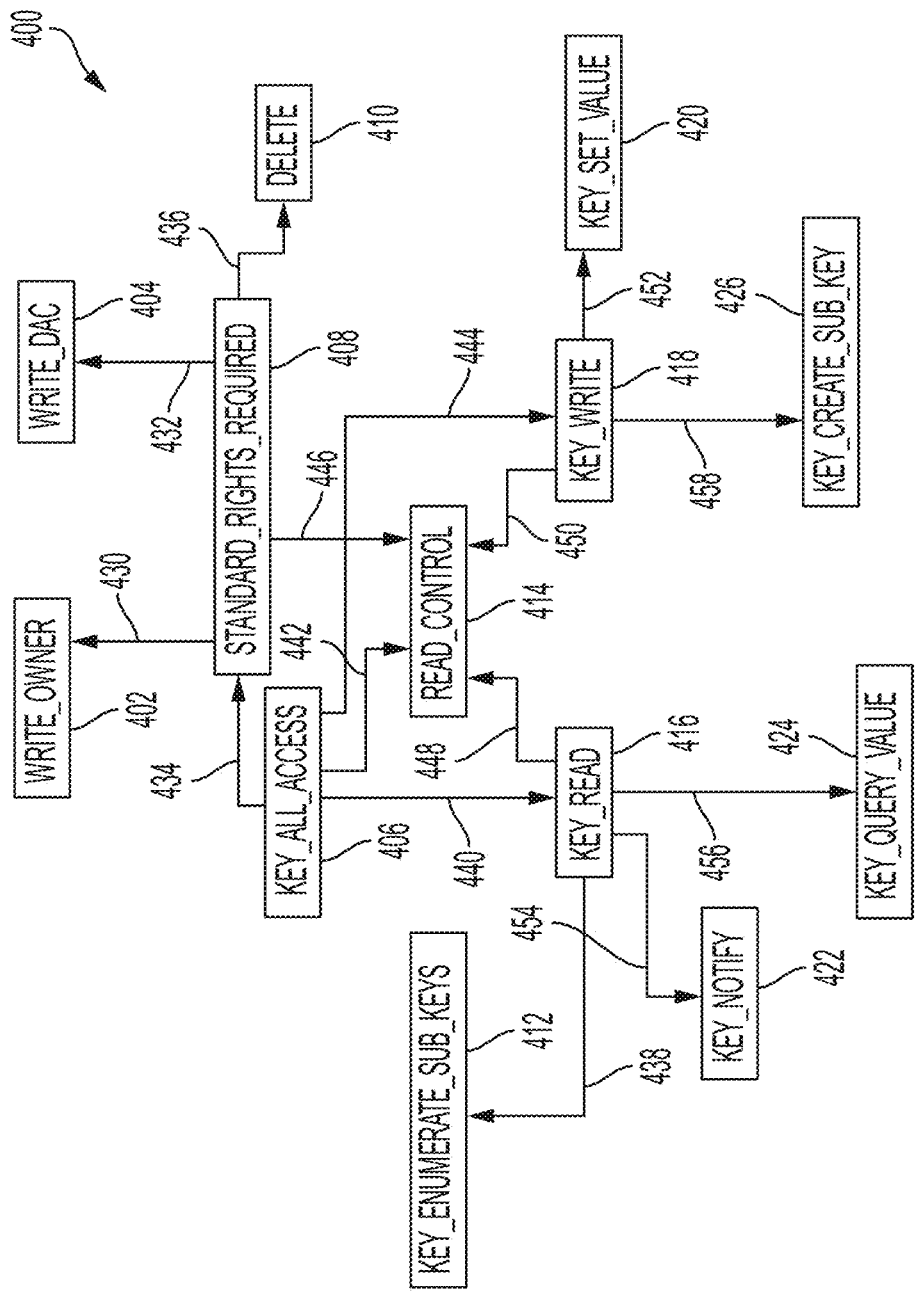
FIG. 4 illustrates a diagram with an example of registry key permissions, in accordance with an embodiment of the present application.

FIG. 4 illustrates a diagram 400 with an example of registry key permissions, in accordance with an embodiment of the present application. Diagram 400 can include permissions with inherited permissions. A key_all_access 406 can imply the following four permissions: a key_read permission 416; a read_control permission 414; a key_write permission 418; and a standard_rights_required permission 408 (as indicated respectively by arrows 440, 442, 444, and 434). The standard_rights_required permission 408 can imply the following three permissions: a write_owner permission 402; a write_DAC permission 404; and a delete permission 410 (as indicated respectively by arrows 430, 432, and 436). The key_read permission 416 can imply the following four permissions: a key_enumerate sub_keys permission 412; a key_notify permission 422; a key_query_value permission 424; and read_control permission 414 (as indicated respectively by arrows 438, 454, 456, and 448). The key_write permission 418 can imply the following three permissions: read_control permission 414; a key_set_value permission 420; and a key_create sub_key permission 426 (as indicated respectively by arrows 450, 452, and 458).

Resource containment is similar to role nesting. A disk drive, such as a Windows E: drive, can contain all the top-level folders, e.g. E:\Shared, E:\Home. Each of those top-level folders, in turn, may contain other folders and files. Permissions (e.g., each permission as indicated in FIG. 4) assigned to a container can be inherited by the contained resources. Resource containment can apply to any resource type, such as registry keys, network subnets, or service chaining.

Windows Algorithm to Determine Allow/Deny Based on ACEs

The Windows algorithm can represent ACEs as a queue, where the resource is implicit in the ACE entry, as the ACE queue can be stored on the resource itself. An ACE entry can include {Principal, Action, Permission(s)}, e.g., {"George," "Deny," and "[Read, Write]" }. Assume that R is a resource of interest, e.g., C:\A\B. While R is not empty (i.e., not NONE), the system can collect all the Deny ACE entries from the resource R and append them to the ACE queue for resource R. The system can collect all the Allow ACE entries for the resource R and append them to the ACE queue for resource R. The system can then perform the same actions for the parent of R, by setting R to R.parent (e.g., C:\A), and continue these operations until the root or main parent has been reached (e.g., C:\). Thus, the system can append ACE entries from higher directory levels as it continues performing the same above-described actions.

The Windows algorithm can also test if a given permission P is allowed for a user U and for every group Gi of which user U is a member. For each ACE, starting from the head and moving to the tail of the ACE queue, if any of {U, Gi} matches a given ACE and the permission on the given ACE is the given permission P, then the system will Allow or Deny the given permission P for the respective {U, Gi} based on the given ACE.

Calculating Effective Permissions Based on Assigned Permissions and Group Membership The described embodiments can use bit vectors to represent the ACEs, in which each column of a bit vector represents a principal and a permission (e.g., Alice Read, Alice Write, Bob Read, Bob Write, Group1 Read, Group1 Write). An oversimplified example of an effective permissions calculation in logic is described below in relation to FIGS. 5A and 5B. The effective permissions can be represented as a single bit vector, which is based on the following four values: a local allow (LA) permission; a local deny (LD) permission; an inherited allowed (IA) permission; and an inherited deny (ID) permission. The effective permission E (or "eff0") can be calculated as follows, where 1 is true and 0 is false: E =Not LD AND (LA OR (NOT ID AND ID)). If LD is true (1), then E is false (0). If LD is false (0), then the system evaluates LA: If LD is false (0) and LA is true (1), then E is true (1); if LD is false (0) and LA is false (0), but if ID is false (0) and IA is true (1), then E is true (1); and if LD is false (0) and LA is false (0), but if ID is true (1), then E is false (0).

Thus, the system can represent every possible (Principal, Permission) pair as a bit vector and then evaluate a predicate to determine what is allowed or denied. However, as described above, due to the interaction of deny and allow permissions via nested groups, inheritance, or blocked inheritance, the situation may become more complex. Each resource can include a set of assigned Allow and Deny permissions, which must be "convolved" or mixed with all possible groups (i.e., combined while taking into account group memberships) to yield the possible effective set of permissions for a user. The system can also combine these with inherited permissions and evaluate the effective rights equation for any "child" resources.

Figure 5A:
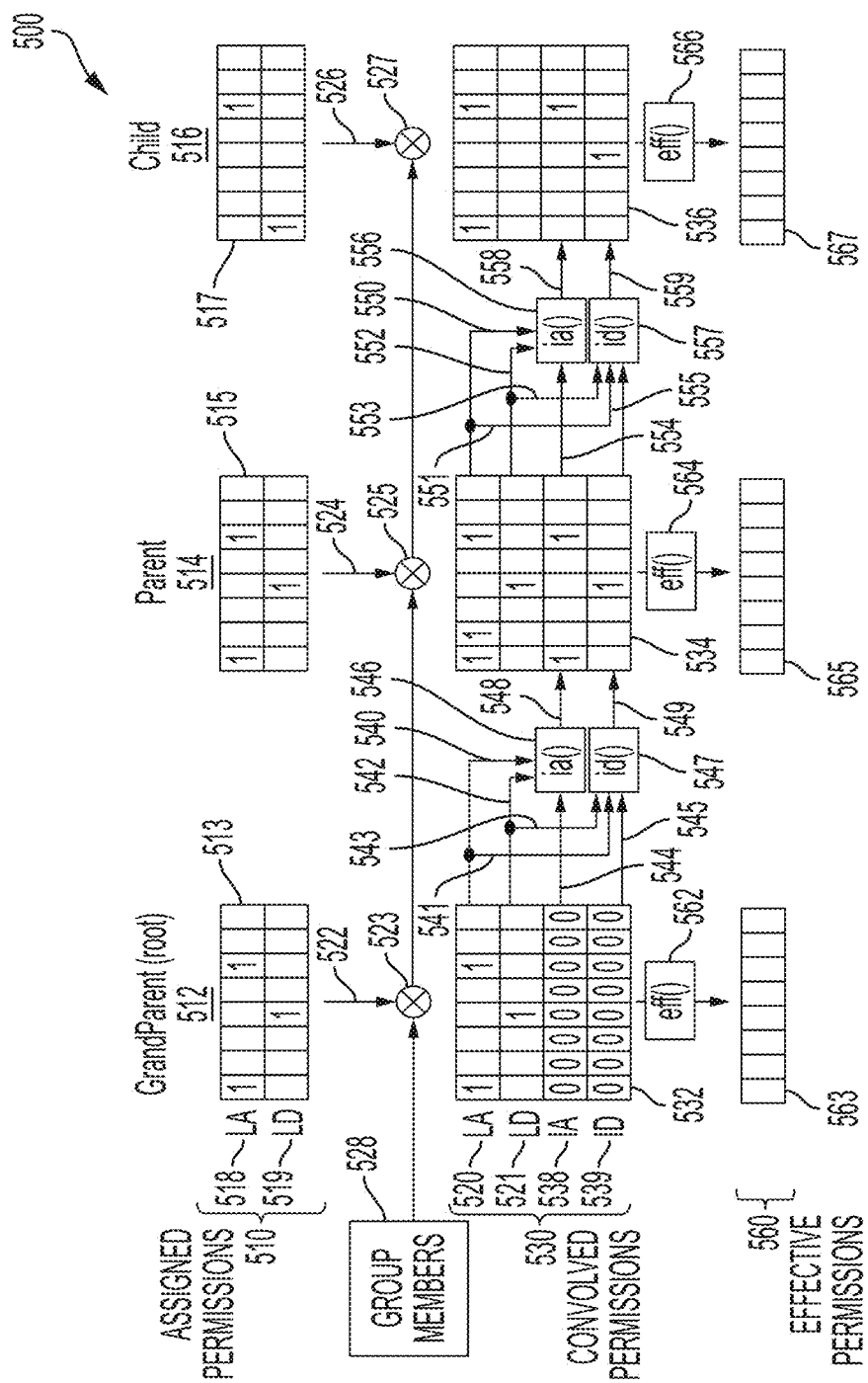
FIG. 5A illustrates a diagram for calculating the effective permissions on resources, including assigned permissions, assigned group memberships, a convolved matrix of permissions, and effective permissions, in accordance with an embodiment of the present application.

The described embodiments address the complexities of determining the effective permissions based on the interaction of deny/allow permissions while accounting for nested groups, inheritance, or blocked inheritance. FIG. 5A illustrates a diagram 500 for calculating the effective permissions on resources, including assigned permissions 510, assigned group memberships 528, convolved matrices of permissions 530, and effective permissions 560, in accordance with an embodiment of the present application. Diagram 500 can include three resources with inheritance. Each resource has a local allow (LA) 518 and a local deny (LD) 519 assigned permission vector. Each column of the vector can represent a capability assignment (i.e., a principal and a permission), such as "Alice READ," "Alice WRITE," "UserGroup0 READ," "UserGroup0 WRITE," etc. In diagram 500, assigned permissions 510 can include the following: a grandparent (root) 512 has an assigned permission vector 513; a parent 514 has an assigned permission vector 515; and a child 516 has an assigned permission vector 517. As described above, a resource can be a directory (e.g., C:, C:\apple, C:\apple\pie), a registry entry, an Active Directory object, etc. The permissions are specific to the resource. If a permission is denied (LD), that LD takes precedence and prevents an action or permission on the stated resource. If a permission is allowed (LA), that LA allows the principal (e.g., Alice) to perform the operation (e.g., READ) on the resource (e.g., Parent).

Group members 528 can indicate which users are in which groups and which groups are in which other groups. As an example, given three groups G0, G1, and G2, and user Alice, the following group memberships are possible: Alice does not belong to any group; Alice belongs to only one of G0, G1, and G2; Alice belongs to only one of (G0,G1), (G0,G2), and (G1,G2); Alice belongs to (G1,G2,G3); Alice belongs to G0, and G0 is in either G1 or G2; etc.

Circle-X symbols 523, 525, and 527 can denote the "convolving" or mixing of these described objects, i.e., information from group members 528 and assigned permission vectors 513, 515, and 517 for, respectively, the three resources 512, 514, and 516 via paths 522, 524, and 526. The effective permissions depend upon which permissions are assigned to which user/groups and how those user/groups may be nested together via group memberships (as indicated by group members 528). The term "convolving" can refer to a mixing of the described objects, and can further refer to expanding the assigned permissions, passing the expanded assigned permissions through the group memberships, and generated the expanded LA and LD.

Convolved permissions 530 can be represented by matrices which include the expanded LA 520 and LD 521 permissions of the corresponding resource as well as the inherited allow (IA) 538 and the inherited deny (ID) 539 permissions based on containment of resources and inheritance/blocking of permissions. IA 538 and ID 539 can describe how permissions propagate from a parent to a child resource. For example, if Alice has READ permission to grandparent 512, she would also have READ permission to parent 514 unless that specific permission is blocked by an LD Alice READ on parent 514.

Convolved permissions 530 can include the following: a convolved permission matrix 532 associated with grandparent (root) 512 resource; a convolved permission matrix 534 associated with parent 514 resource; and a convolved permission matrix 536 associated with child 516 resource.

Returning to assigned permissions 510, for each group column in assigned permission vectors 513, 515, and 517, the values for every member of that group column can be logically OR'ed into the respective "convolved LA" or "convolved LD" column. More specifically, for a resource R, the system can initialize the convolved matrix to 0 for each entry. For every group G and permission P, and for every principal S, the system can determine if S is a (possibly nested) member of G, and if so, set the two following values:

$$CONV_R [(S,P), LA] = CONV_R [(S,P), LA] \text{ OR} \\ ASSGN_R [(G,P), LA] \quad (1)$$

$$CONV_R [(S,P), LD] = CONV_R [(S,P), LD] \text{ OR} \\ ASSGN_R [(G,P), LD] \quad (2)$$

where (S,P) identifies the columns and LA, LD identifies the row, CONV is the convolved matrix, $CONV_R$ is the convolved matrix for resource R, ASSGN is the assigned matrix, and $ASSGN_R$ is the assigned matrix for resource R. Note that expressions (1) and (2) are written in an iterative, procedural style, and not as they would be expressed in first order logic.

In first order logic, expressions (1) and (2) can be written as:

$$(\text{member } S \ G) => \{(\text{member } (G,P) \text{ ASSGN\_LA}[R]) => \\ (\text{member } (S,P) \text{ CONV\_LA}[R])\} \quad (3)$$

$$(\text{member } S \ G) => \{(\text{member } (G,P) \text{ ASSGN\_LD}[R]) => \\ (\text{member } (S,P) \text{ CONV\_LD}[R])\} \quad (4)$$

Because expressions (3) and (4) use one-way implications (as depicted below in relation to FIG. 5B), another set of equations is needed to solve for the assigned capabilities given the convolved matrix, as described below.

Furthermore, if a child inherits permissions from its parent, then the system must use the IA( ) and ID( ) functions from the parent to the child. For each capability (S,P):

$$CONV_C [(S,P), IA] = (\text{NOT } CONV_P [(S,P), LD]) \text{ AND} \\ (CONV_P [(S,P), LA] \text{ OR } CONV_P [(S,P), IA]) \quad (5)$$

$$CONV_C [(S,P), ID] = (CONV_P [(S,P), LD]) \text{ OR } ((\text{NOT} \\ CONV_P [(S,P), LA]) \text{ AND } CONV_P [(S,P), ID]) \quad (6)$$

where $CONV_C$ is the child's convolved matrix and $CONV_P$ is the parent's convolved matrix.

Another way to represent expressions (5) and (6) is, respectively, as follows, where PAR is a parent resource and CHI is a child resource:

$$\text{CHI.convolved.IA} = (\text{not PAR.convolved.LD}) \text{ AND} \\ (\text{PAR.convolved.LA OR PAR.convolved.IA}) \quad (7)$$

$$\text{CHI.convolved.ID} = (\text{PAR.convolved.LD}) \text{ OR } ((\text{NOT} \\ \text{PAR.convolved.LA}) \text{ AND } (\text{PAR.convolved.ID})) \quad (8)$$

For example, IA( ) 546 for convolved matrix 534 for parent 514 ("child") can be calculated by taking input based on the LA and LD permissions of its parent, i.e., grandparent 512 ("parent") (via paths 540 and 542, respectively) as well as the IA permissions of its parent (i.e., grandparent 512) (via path 544). Similarly, ID( ) 547 for convolved matrix 534 for parent 514 ("child") can be calculated by taking input based on the LA and LD permissions of its parent, i.e., grandparent 512 ("parent") (via paths 541 and 543, respectively) as well as the ID permissions of its parent (i.e., grandparent 512) (via path 545).

As another example, IA( ) 556 for convolved matrix 536 for child 516 can be calculated by taking input based on the LA and LD permissions of its parent 514 (via paths 550 and 552, respectively) as well as the IA permissions of its parent 514 (via path 554). Similarly, ID( ) 557 for convolved matrix 536 for child 516 can be calculated by taking input based on the LA and LD permissions of its parent 514 (via paths 551 and 553, respectively) as well as the ID permissions of its parent 514 (via path 555).

After convolved matrices 532, 534, and 536 have been generated, the system can calculate the effective permissions for each resource ("eff( )"), indicated as 562, 564, and 566, which results, respectively, in effective permissions 563, 565, and 567. As described above, the algorithm for calculating these effective permissions is, in summary, as follows: If the permission is LD, then deny. Else if it is LA, then allow. Else if it is ID, then deny. Else if it is IA, then allow. Else deny.

How to Model Group Memberships

Modeling group memberships may be based on a policy specified in the scenario file. An exemplary scenario file and policy file are described below in relation to FIGS. 7A and 7C. The policy can specify the cost of different relationships among objects, such as the cost from a user to a group, a group to another group, a user to a resource, and a group to a resource. By adjusting these relationship costs in the policy, the administrator can lay out a policy which can use, prefer, or rely upon the organization of objects in the system.

The system can model these relationships as memberships. If a user or a group is a member of a group, the system can establish a path through the groups to a resource. If a user or group plus a permission is a member of a resource's discretionary access control list (DACL), the system can allow or deny the capability based on the ACE.

Figure 6:
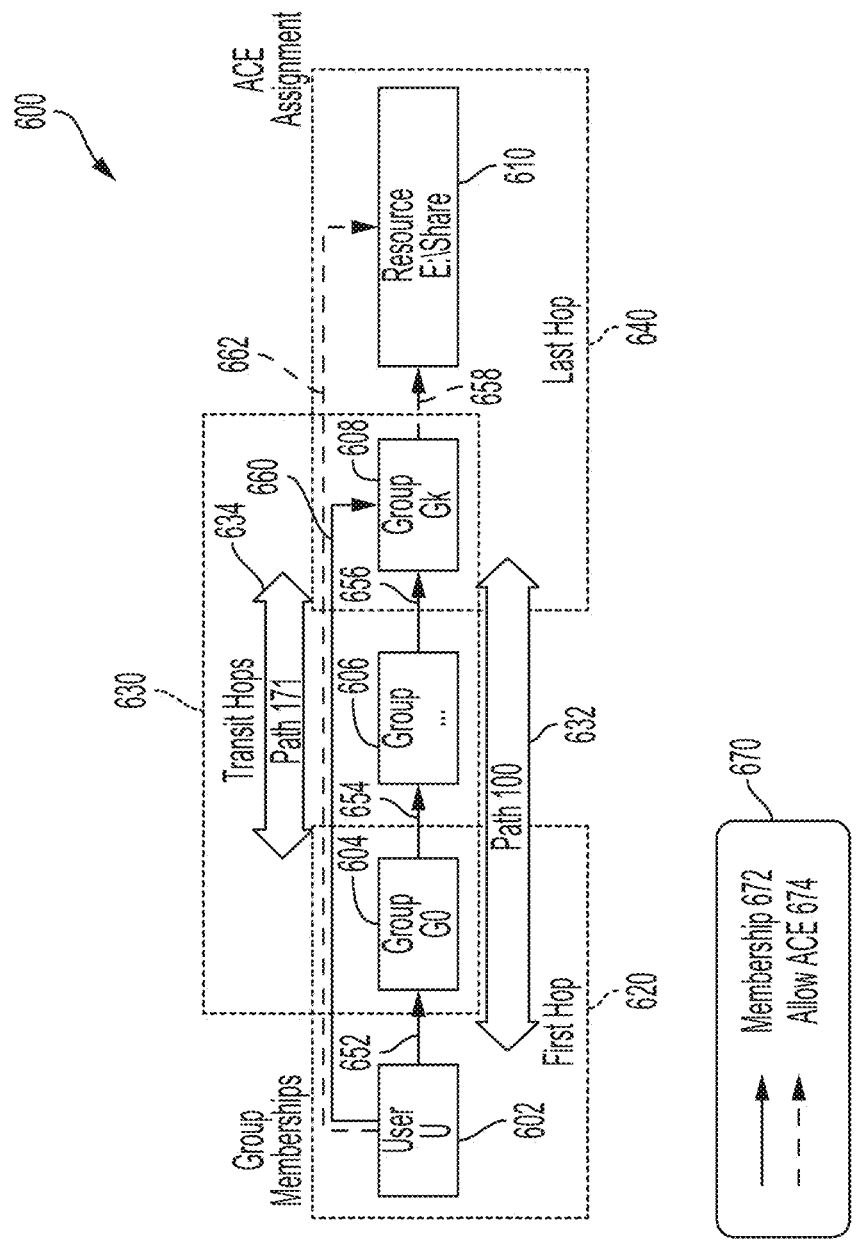
FIG. 6 depicts a diagram illustrating a schematic representation of the SCIBORG RBAC process, including an ACE assignment based on group memberships, transit hops, and a last hop, in accordance with an embodiment of the present application.

FIG. 6 depicts a diagram 600 illustrating a schematic representation of the SCIBORG RBAC process, including an ACE assignment based on group memberships, transit hops, and a last hop, in accordance with an embodiment of the present application. An index 670 can indicate various types of relations between entities in diagram 600, e.g.: a solid-line arrow can represent a membership relation 672; and a dashed-line arrow can represent an allow relation 674.

Diagram 600 can include a user U 602 which is a member of a group G0 604, which is a member of another group 606, which is a member of a group Gk 608, which has an allow permission to a resource 610. In diagram 600, the full path from user U to resource 610 can be divided between the following three sections: a first hop 620 (e.g., from user 602 to group G0 604 via a path 652); transit hops (if any) 630 (e.g., a path 171 634) and a last hop 640 (e.g., from Group Gk 608 to resource 610_). In addition, other paths are depicted, such as a path 100 632 from user U 602 to group Gk 608.

The last hop must always exist. If the first hop does not exist, a user is assigned a direct permission to a resource (e.g., an allow permission 662). If the transit hops do not exist, a user can belong to a first group, which first group has a permission assignment to a resource (e.g., a membership path 660 from user U 602 to group Gk 608, where group Gk has an allow permission 658 to resource 610).

The notation "(path N)" can be used to indicate a path with an index N (a natural number). In the logic solver of the instant system, these can be known as uninterpreted functions, and specifically, in this case, a function from a number to a Boolean (e.g., TRUE or FALSE). If (path N) is true, the path exists and all of the implied memberships are true. If (path N) is false, not all of the implied memberships are true (some or none may be true, but not all).

Diagram 600 depicts some sample paths which all lead to Gk:

(path 100)=>(path 171) or (path 172) or . . .

(path 0)=>(member U G0)

(path 1)=>(member G0 G1) and (member G1 G2) and . . . (member Gk−1, Gk)

(path 2)=>(member G0 Gk)

. . .

(path 171)=>(path 0) and (path 1)

(path 172)=>(path 0) and (path 2)     (9)

In the example of FIG. 6: the first hop is (path 0); the feasible intermediate paths are (path 1) . . . (path j); and the overall paths are (path 171) . . . . The system can determine the feasible intermediate paths based on policy restrictions imposed by the administrator (e.g., via the policy file) and by other heuristics (e.g., based on Yen's algorithm). The system can use the above information, including the feasible intermediate paths, to reduce the total state in the system. For example, the system may only generate the top M shortest paths from U to Gk.

To establish a permission assignment, the system can use logic such as:

(member ( U,P) R.effective) =>
  (OR
    (member (U,P) R.effective)
    (path 100) and (member (Gk, P) R.effective)
    ...
  )     (10)

The system can enumerate the possible paths to a terminal group and lastly the final capability assignment to a resource. The case where (member (U,P) R.effective) is TRUE can correspond to the case where there is not a first hop or any transits, but only the last hop permission assignment.

The system can select the best or optimal paths by using MaxSAT constraints in the logic solver and further by using edge weights based on the policy file in order to determine a path cost. For example, note the following expression:

(assert-soft (not (path 0)):weight 10)     (11)

This expression can instruct the logic solver to prohibit a path 0 (i.e., the path function operating on "0" can map to FALSE). If the solver needs path 0, e.g., to realize a permission requirement, the system must relax one of the soft constraints. The system will attempt to minimize the cost of the relaxed constraints, such that using the edge or path cost as the weight can achieve the purpose.

How SCIBORG Solves for Windows Assigned Permissions

Recall that FIG. 5A describes a framework for how to calculate the effective permissions given the assigned permissions and group memberships, including the convolved matrices. However, complexities and challenges exist in determining the effective permissions based on the interaction of deny/allow permissions while accounting for nested groups, inheritance, or blocked inheritance. The described embodiments can solve the problem indicated in FIG. 5A in reverse. That is, by starting with the effective permissions, the system can generate the assigned permissions and assigned group memberships, which can allow an administrator to set the effective permissions and subsequently generate or determine the underlying group memberships and actual Allow/Deny permissions for a given principal on a particular resource. This can result in a more modular and efficient system, as the administrator may merely set certain rules in the policy file and certain permissions in the scenario file (described below) and maintain a level of transparency or abstraction to the actual assigned Allow/Deny permissions and the group membership assignments, as described below in relation to FIG. 5B.

Figure 5B:
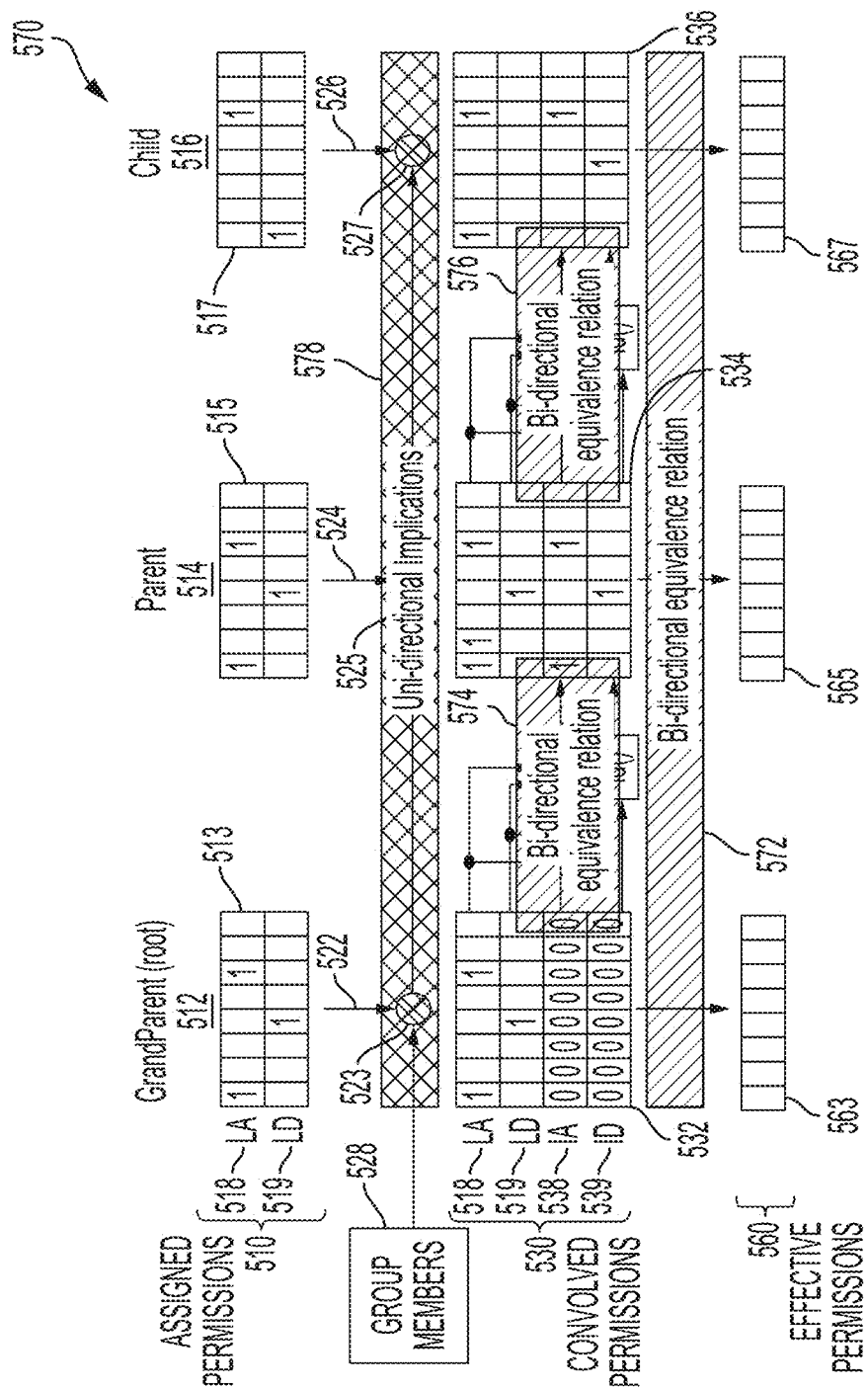
FIG. 5B illustrates a diagram solving the reverse problem indicated in FIG. 5A, by starting with the effective permissions and obtaining the assigned permissions and assigned group memberships by deconvolving certain data, in accordance with an embodiment of the present application.

FIG. 5B illustrates a diagram 570 solving the reverse problem indicated in FIG. 5A, by starting with effective permissions 560 and obtaining assigned permissions 510 and assigned group memberships 528 by "deconvolving" certain data, in accordance with an embodiment of the present application. Diagram 570 indicates that a bidirectional equivalence relation 572 exists between convolved matrices 532, 534, and 536 and effective permissions (eff( ) 563, 565, and 567. Diagram 570 further indicates that: a bidirectional equivalence relation 574 exists between convolved matrix 532 (for grandparent 512) and convolved matrix 534 (for parent 514); and a bidirectional equivalence relation 576 exists between convolved matrix 534 (for parent 514) and convolved matrix 536 (for child 516). However, uni-directional implications 578 exist between each convolved matrix and its corresponding assigned permissions, e.g.: between convolved matrix 532 and assigned permissions 513; between convolved matrix 534 and assigned permissions 515; and between convolved matrix 536 and assigned permissions 517. A detailed description of both bi-directional equivalence relations (572, 574, and 576) and uni-directional implications (578), including with equations on solving from assigned to convolved, convolving assigned with groups, and solving from convolved to assigned is provided below in the section titled "Access Control Entry Requirements."

Scenario File

A user or administrator can specify the system configuration using a scenario file, which can be a JSON file which collects or references a set of JSON files, as described below in relation to FIG. 7A. The three main types of information or JSON files referenced in the main scenario file include: the specification ("as-desired); the current state ("as-is"); and policies, which three types of information are indicated as 702, 704, and 706, respectively, in FIG. 7A. Each of these types of information can be in one or more JSON files, and referenced accordingly in the scenario file. The system can merge or append the referenced set of JSON files in any order. That is, one single large file may be used for the specification, current state, and policy information.

Figure 7A:
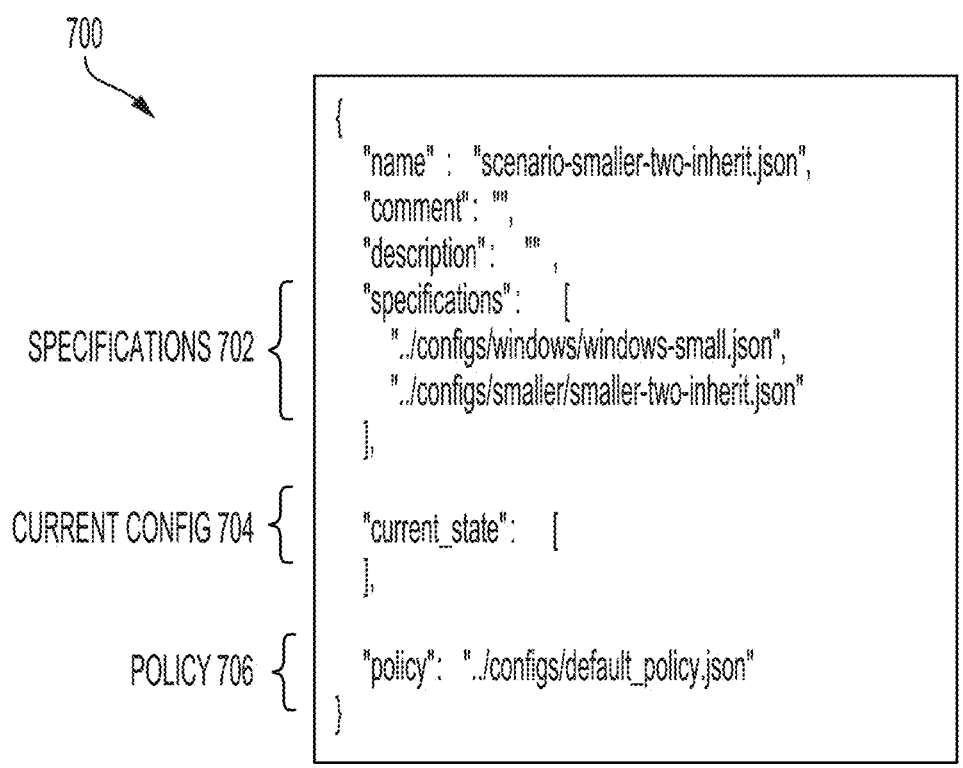
FIG. 7A depicts an exemplary scenario file in JSON format, in accordance with an embodiment of the present application.

FIG. 7A depicts an exemplary scenario file 700 in JSON format, in accordance with an embodiment of the present application. Scenario file 700 can include a name, a comment, and a description, as well as: specifications 702 (which can include calls to other JSON specification files, as depicted below in FIG. 7B); a current configuration 704; and a policy 706 (e.g., a call to a JSON policy file, as depicted below in FIG. 7C).

Scenario File: Specification

The specification can define domains, computers, users, groups, trust relations, roles, resources, etc., as described below and in relation to FIG. 7B. The specification can also include assigned capabilities, e.g., a permission on a resource for a principal, as described below in relation to FIG. 7E.

Because the system takes the union of multiple JSON files (e.g., multiple specification files), many fields in a given specification file may be left blank and specification files may be organized based on logical content or any other category. For example, one specification file for group membership may only define a particular role (group) and the members of the group, where all the other fields are blank. This file, and other similar files, may be merged with all specification files to create the overall scenario file or detailed manifest describing the structure and end goal configuration of the system.

FIG. 7B depicts an exemplary specification file 710 in JSON format referenced from a scenario file, in accordance with an embodiment of the present application. Specification file 710 can include or define domains, computers, users, trust relations, roles, groups/memberships, privileged indicators, unauthenticated principals, permissions, effective permissions, resource types, resource permissions, resources, resource containment, and capability assignments. Each of these elements is described in further detail in U.S. patent application Ser. No. 63/245,349.

Scenario File: Current Configuration

The scenario file can also include or reference a current configuration file, which can be of a similar JSON format as the specification files and can specify a current state of the system. The current configuration may not exactly match or include the same elements as the desired specifications.

Scenario File: Policy File

Figures 7C, 7D:
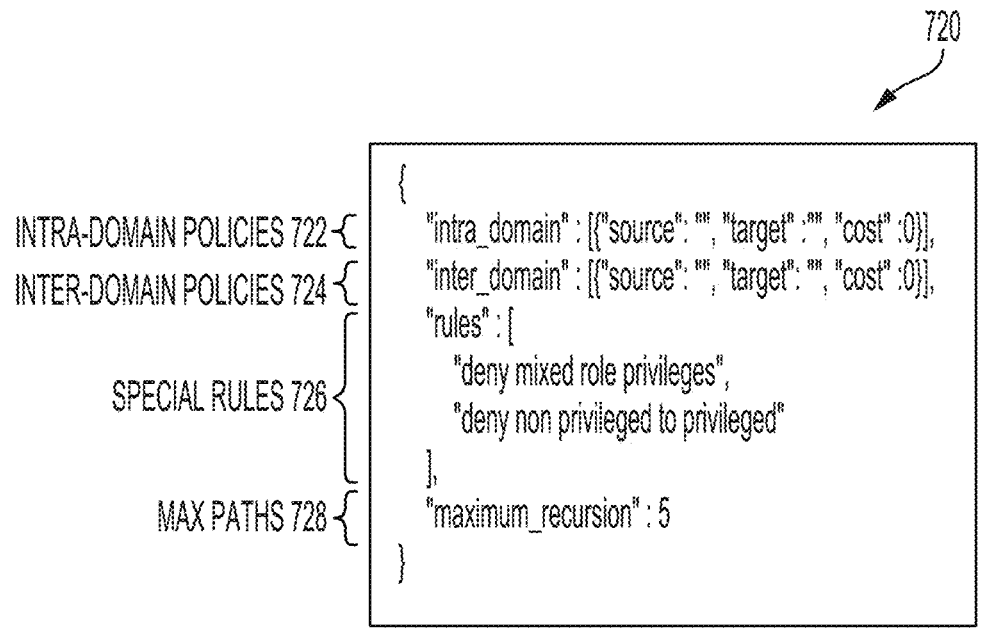
FIG. 7C depicts a portion of an exemplary policy file, in accordance with an embodiment of the present application.
FIG. 7D depicts exemplary intra- or inter-domain rules in a policy file, in accordance with an embodiment of the present application.
Figure 7F:
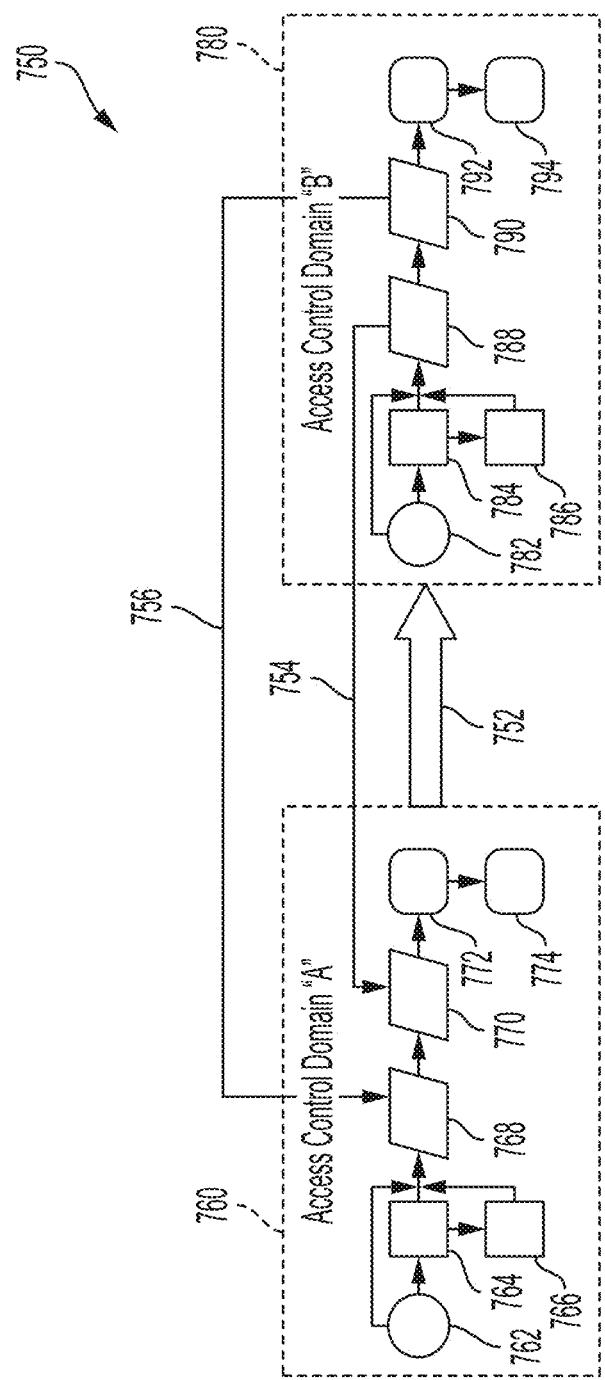
FIG. 7F depicts a diagram illustrating inter-domain trust, in accordance with an embodiment of the present application.

FIG. 7C depicts an exemplary policy file 720, in accordance with an embodiment of the present application. Policy file 720 can include four parts: intra-domain policies 722; inter-domain policies 724; special rules 726; and a max paths 728 (i.e., how long of paths to consider or a maximum recursion). The cost of each edge can be summed for a total path cost. The system (e.g., the solver) can prefer to use lower cost solutions. Each role membership and capability assignment can be considered an edge in a path.

The intra-domain and inter-domain sections (722 and 724) can specify the cost of a relationship. The types of relationships can be represented as allowed edges, including, e.g.: user to role; user to capability; role to role; role to capability; capability to capability (this can occur in resource containment and permission implications); and capability to resource. This can be viewed as specifying the cost of an edge in a graph. The system can use two special tokens: "_ASSIGNED_"; and "_ANY_". The ANY token will match any node type (as used in a rule 743 in FIG. 7D). The ASSIGNED token indicates to the system that if the relationship was explicitly assigned via the capability assignment and membership rules (as used in a rule 742 in FIG. 7D), the system will apply this cost.

If the cost is null, the system will prohibit the relationship. The user configuring the RBAC schemas is responsible for ensuring that all feasible combinations are specified. Note that a user in this model can only be a source and a resource can only be a sink. A capability can only link to another capability or a resource. Examples of the capability to resource relationship are provided below in relation to FIG. 7D.

FIG. 7D depicts exemplary intra- or inter-domain rules 740 in a policy file, in accordance with an embodiment of the present application. The intra-domain rules can be used when the source and target are in the same security domain. The inter-domain rules can be used when the source and target are in different domains.

The "rules" section (726) in FIG. 7C can enumerate two fixed rules that the user may turn on or off. The "deny mixed role privilege" rule allows the system to prohibit role-in-role membership if one role is privileged, and the other is not. The "deny non privileged to privileged" applies to any principal types and allows the system to prohibit any edge from a non-privileged object to a privileged object.

The "maximum_recursion" specification (728) in FIG. 7C is how long—in hops—paths may be. For a single domain with only a few computers, a path length of six can generally suffice. This allows three group nesting relations plus a capability assignment plus the link to the resource plus one level of permission implication, or other similar combinations.

FIG. 7E depicts exemplary capability assignments 745 from a specification file, in accordance with an embodiment of the present application. As described herein, capability assignments make up the core of the specification file (e.g., as shown above in relation to FIG. 7B). The capability assignments drive all the hard constraints on the system. For every granted capability, the system will ensure that some path exists from the principal to the resource capability. This path may occur through role memberships and/or resource containment. Any capability which is not implicitly allowed from the capability assignment and membership elements will be a hard deny.

Multiple entries may exist for a principal, and these multiple entries will be merged. The name of the principal must match a user or role name. A permission must match one of the permission names. The resource must match the name of a resource.

In some embodiments, a user can specify capability dependencies. For example, a user may wish to specify that "login" on a computer requires that an anonymous user has "read" to a specific registry key on that computer. In other embodiments, a permission dependency can be expressed by the user as a set of granted permissions—all other permissions are denied.

The described system (e.g., the SCIBORG RB_AC Model) can also support inter-domain trust, as shown below in FIG. 7F. FIG. 7F depicts a diagram 750 illustrating inter-domain trust, in accordance with an embodiment of the present application. Diagram 750 can include an access control domain "A" 760 and an access control domain "B" 780. Domain A 760 can include: a user 762; roles or groups 764 and 766; permissions 768 and 770; and resources 772 and 774. Domain B 780 can include: a user 782; roles or groups 784 and 786; permissions 788 and 790; and resources 792 and 794.

If domain A 760 trusts domain B 780 (indicated by a trust relationship arrow 752), then users and roles (e.g., user 782 and roles 784 and 786) from domain B 780 may be used in domain A 760. As a result, a user or role from domain B 780 could be placed in a role in domain A 760. Furthermore, a user or role (e.g., user 782 and roles 784 and 786) from domain B 780 may be assigned a capability directly in domain A 760. This can be indicated by permission inheritance arrows 754 and 756, respectively, from permission 788 in domain B 780 to permission 770 in domain A 760 and from permission 790 in domain B 780 to permission 768 in domain A 760.

Inter-domain trust may occur in Windows Active Directory (AD) setups. Each computer, whether in a domain or not, can have its own local users and groups. This may be the lowest level of a security domain. A computer that is in an AD domain can trust that AD domain. AD domains can commonly form trees, which are represented by trust relationships.

The described aspects of the system can support multiple trust relationships, but the trust relationships are not transitive. If C trusts B and B trusts A, then users/groups from A may be used in B and users/groups from B may be used in C. However, this does not imply that a user from A could be used directly in C. In some embodiments, trust relationships may be symmetric, such as A trusts B and B trusts A.

Domain Graph and Access Control Graph

As described above, the access control graph can be created based on input files which can include user-specified desired effective permissions (e.g., as capability assignments in a scenario file) as well as user-specified group memberships. The domain graph can be created based on input which can include user-specified policies and rules (e.g., as inter-domain policies, intra-domain policies, and rules in a policy file). The system can use the domain graph and the access control graph to synthesize the logic required to generate the multi-layer graph.

Domain Graph

The domain graph can be created based on the structure of, e.g., systems modeled by a Windows domain model. The domain graph can include users, groups, and resources indicated as nodes associated with a particular domain. The domain graph can represent all the possible paths between a user and a resource. The paths may include the group memberships edge and permission edges. Intra-domain or inter-domain membership of a user to a group may be indicated by a uni-directional edge from the user to the group. Intra-domain or inter-domain membership of a first group to a second group may be indicated by either a uni-directional edge or a bi-directional edge from the first group to the second group (depending on whether the group membership also applies from the second group to the first group). A permission of a user or a group on a resource can be indicated by a uni-directional arrow from the user or group to the resource. Inheritance of a permission from a first resource to a second resource can be indicated by a uni-directional arrow from the first resource to the second resource.

The system can limit the domain graph using various techniques. Certain edges may be pruned based on the user-specified policies and rules, which can indicate that these pruned edges are prohibited. For example, the system may limit the domain graph to edges from a trusted domain to a trusting domain. In Windows, every computer can represent a security domain and can trust the domain to which it belongs. An organization or company may have multiple Active Directory (AD) domains with specific trust relationships between those multiple AD domains. Furthermore, some groups or users may be considered privileged users or groups. The user can specify a rule which removes all edges from a privileged user/group to an unprivileged group (i.e., do not place a privileged user in an unprivileged group). This can be indicated by the "deny mixed role privilege" rule depicted above in relation to FIG. 7C.

The system can also use the domain graph, based on the user-specified policies, to determine the best way to form group memberships. For example, the policy file may include a rule which indicates that a user may not have a direct permission to a given resource but should instead belong to a group which has permission to the given resource. As another example, a policy file rule can indicate that a group in Domain A may not have direct permission to a given resource in Domain B but should belong to a group in Domain B which has permission to the given resource.

The system allows the user to assign a particular weight or cost to each edge. For example, a permission edge from user Alice in Domain A to a resource R1 in Domain B may have a cost of 1000, while an alternate path may have a much lower overall cost, e.g.: a membership edge from Alice to Group G0 in Domain A may have a cost of 1; a membership edge from Group G0 in Domain A to Group G1 in Domain B may have a cost of 1; and a permission edge from Group G1 to resource R1 in Domain B may have a cost of 1. The alternate cost has a much lower cost (of 3). The system can select the least cost path to determine the group memberships using the domain graph. The assigned weights may vary based on the type of user, the type of group, and the type of resource.

Thus, the system can use a shortest-path algorithm (such as Yen's algorithm) to solve for preferred configurations of group memberships. That is, the pruned and mapped possible paths of the domain graph allow the system to determine a least cost path from a user to a resource (e.g., via groups) and also can solve the group membership problem (described above in relation to FIGS. 5A and 5B).

Figure 8A:
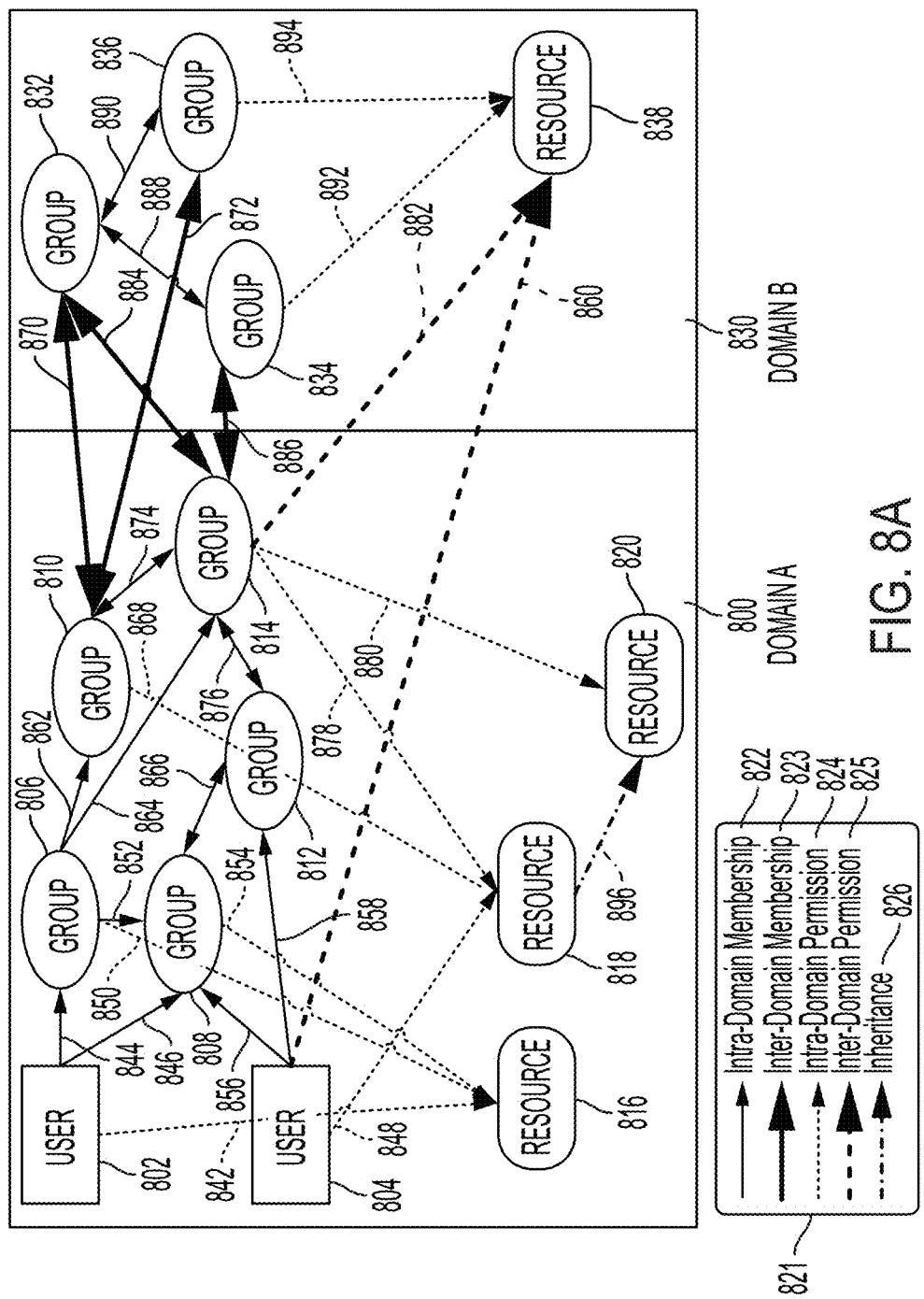
FIG. 8A depicts a diagram illustrating a portion of a domain graph, in accordance with an embodiment of the present application.

FIG. 8A depicts a diagram illustrating a portion of a domain graph, in accordance with an embodiment of the present application. Memberships, permissions, and inheritance can be indicated by uni-directional or bi-directional edges, as indicated by an index 821. Arrows or edges which cross a domain boundary (e.g., inter-domain memberships or permissions) may be indicated differently than similar arrows or edges which do not cross a domain boundary (e.g., inter-domain memberships or permissions). For example: a solid line edge can indicate an intra-domain membership 822; a thick line edge can indicate an inter-domain membership 823; a dashed line edge can indicate an intra-domain permission 824; a thick dashed line edge can indicate an inter-domain permission 825; and a dotted dashed line edge can indicate an inheritance 826 relation.

Diagram 800 can include: a Domain A 800; and a Domain B 830. Domain A 800 can include: users 802 and 804; groups 806, 808, 810, 812, and 814; and resources 816, 818, and 820. Domain B 830 can include: groups 832, 834, and 836; and a resource 838. User 802 can be a member of groups 806 and 808 (respectively, via edges 844 and 846). User 802 can have a permission on resource 816 (via an edge 842). User 804 can be a member of groups 808 and 812 (respectively, via edges 856 and 858). User 804 can have permissions on resources 818 and 838 (respectively, via edges 848 and 860). Group 806 can be a member of groups 808, 810, and 814 (respectively, via edges 852, 862, and 864). Group 806 can have a permission on resource 816 (via an edge 850). Group 808 can be a member of group 812 (via an edge 866). Group 808 can have a permission on resource 816 (via an edge 854). Group 810 can have a permission on resource 818 (via an edge 868). Group 810 can be a member of groups 832, 836, and 814 (respectively, edges 870, 872, and 874). Group 812 can be a member of groups 808 and 814 (respectively, via edges 866 and 876). Group 814 can be a member of groups 810, 812, 832, and 834 (respectively, via edges 874, 876, 884, and 886). Group 814 can have permissions on resources 818, 820, and 838 (respectively, via edges 878, 880, and 882). Permissions on resource 818 can be inherited by resource 820 (via an edge 896).

Group 832 can be a member of groups 810, 814, 834, and 836 (respectively, via edges 870, 884, 888, and 890). Group 834 can be a member of groups 814 and 832 (respectively, via edges 886 and 888). Group 834 can have a permission on resource 838 (via an edge 892). Group 836 can be a member of groups 836 and 810 (respectively, via edges 890 and 872). Group 836 can have a permission on resource 838 (via an edge 894).

The domain graph depicted in FIG. 8A can be based on policies and rules specified by the user (e.g., in the scenario file). Each edge in the domain graph can correspond to a certain type of relationship, e.g.: user to role/group; user to capability/resource; role/group to capability/resource; and capability to capability (e.g., resource to resource inheritance). In addition to defining the rules and the policies, the user can also assign weights for each edge, thereby setting a certain cost for a particular relationship in the domain graph. For example, rule 741 in FIG. 7D states that an edge from any user to any resource has a cost of "10":
{"source": "user", "target": "capability", "cost": 10"}.

Rule 742 in FIG. 7D states that any relationship that was explicitly assigned between a given source and target (i.e., explicitly assigned via a capability assignment and/or membership rule of the scenario file) has a cost of "1";
{"source": "_ASSIGNED_", "target": "_ASSIGNED_", "cost": 1"}.

Figure 8B:
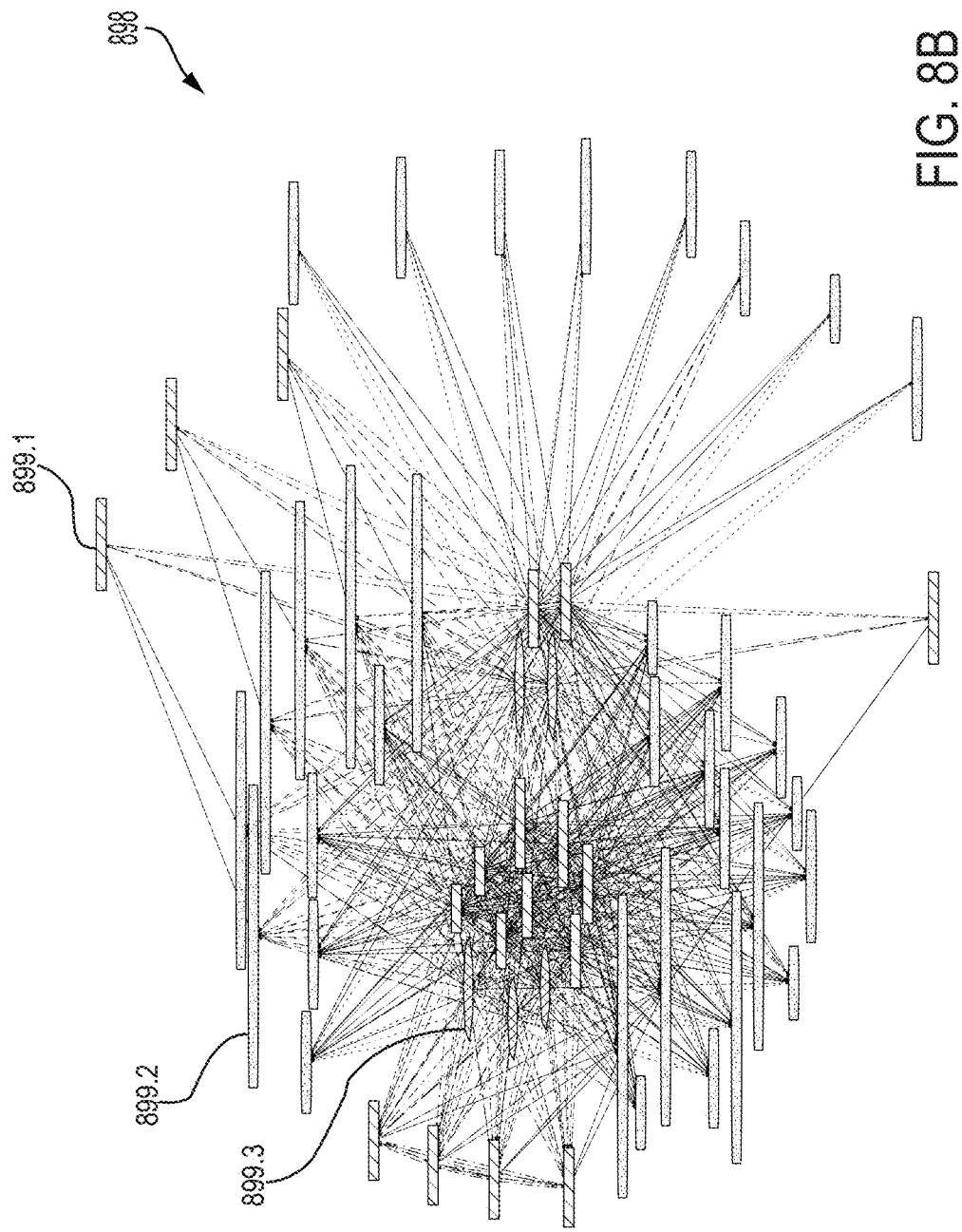
FIG. 8B depicts an exemplary domain graph, in accordance with an embodiment of the present application.

FIG. 8B depicts an exemplary domain graph 898, in accordance with an embodiment of the present application. Domain graph 898 can represent a Windows domain model with the following entities: 1 Active Directory (AD) domain; 5 computers, each depicted as a multi-sided oblong shape filled with a cross-hatch pattern, e.g., an element 899.3; 5 users; 18 groups, each depicted as a rectangular shape filled with a diagonally right-slanting pattern, e.g., an element 899.1; and 33 resources (e.g., AD object, registry keys, printer servers, and printers), each depicted as a rectangular shape filled with a speckled pattern, e.g., an element 899.2. While not depicted in color, domain graph 898 can be displayed to a user with different colors which represent the different entities and the various relationships between the entities (e.g., the directed edges shown in FIG. 8A and indicated by index 821).

Access Control Graph

The access control graph can be created based on the user-specified desired effective permissions (e.g., the capability assignments in the scenario file). The access control graph can be used to deduce the actual capabilities of each user or principal to each resource. As discussed above, calculating the Microsoft algorithm for each individual ACE on each {User, Resource} pair can be complex due to the interaction of deny and allow permissions via nested groups, inheritance, or blocked inheritance. The described embodiments address this issue by using a graph algorithm on the access control graph. The access control graph can include: users; groups; assigned permissions; actual permissions; and resources. Each possible permission for each resource can include two nodes: an assigned permission node; and an actual permission node. An assigned permission node can imply one or more actual permission nodes. For example, a Write permission may often imply a Read permission. Furthermore, each actual node can have an "applies" edge to its corresponding resource. Each user or group may have one or an "allow" or "deny" edge to an assigned permission, which can correspond to granting or denying a permission on a corresponding resource. A user may have a "membership" edge to a group.

In some instances, a user may have not any direct allow permissions to an assigned permission node. That is, the only path from a user which allows a permission on a given resource must go through a group to which the user belongs. Furthermore, an assigned permission node can include "inherits" edges to a child resource that inherits permissions from their parent. If such an inheritance is blocked (e.g., as indicated in the scenario file), the corresponding edge does not exist in the access control graph.

The system can assign specific costs to each type of edge: membership edges can have a cost of 0; allow permission edges can have a cost of 1; deny permission edges can have a cost of 1; applies edges can have a cost of 1; and inherits edges can have a cost of 1. An exemplary access control graph is described below in relation to FIG. 9A, while exemplary calculations of the actual permission via a shortest path graph algorithm are described below in relation to FIGS. 9B and 9C. Indeed, all capability assignments and user-specified permissions contained in the scenario file can be converted or transformed into deny/allow permission edges in the access control graph.

Figure 9A:
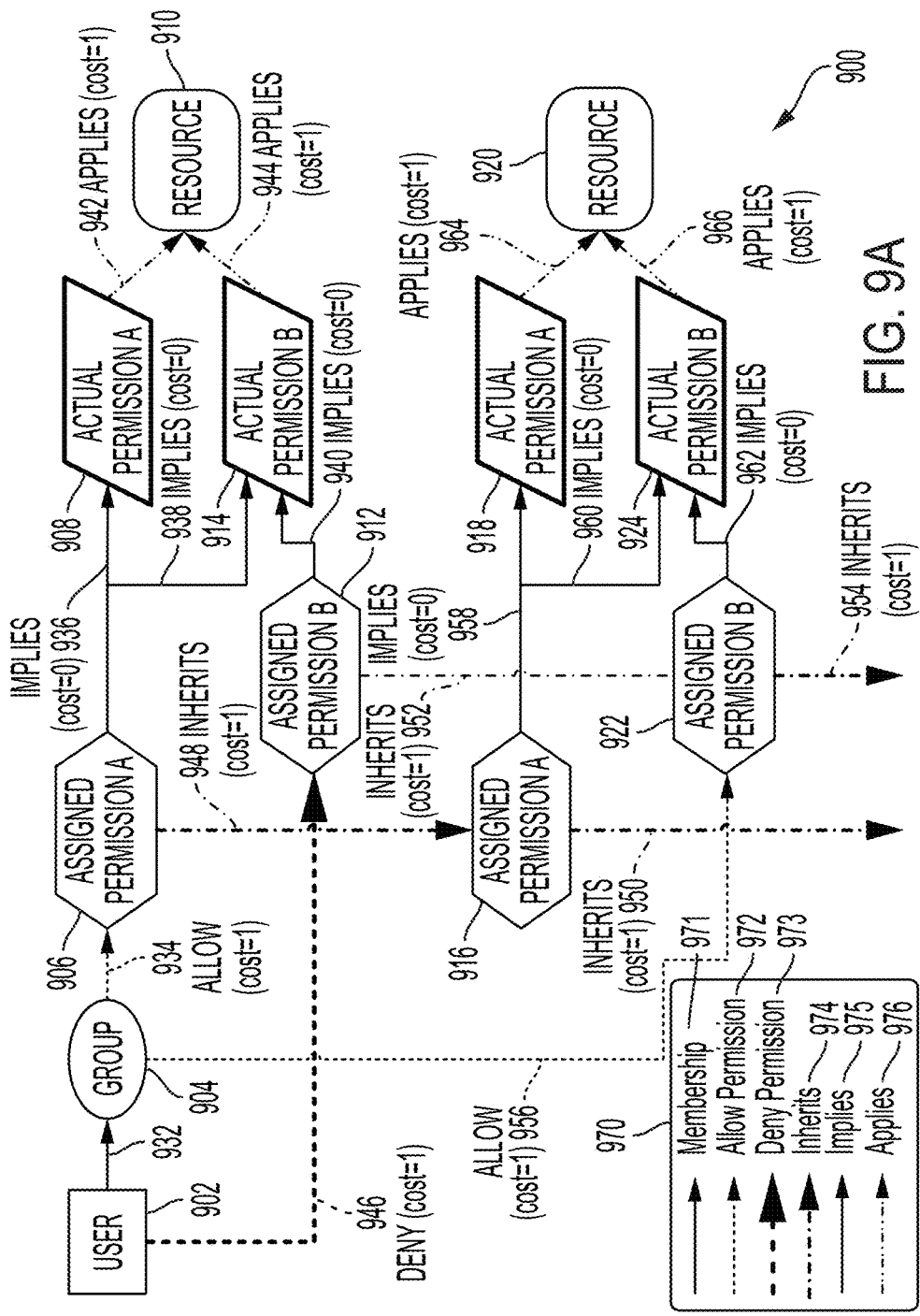
FIG. 9A depicts an exemplary access control graph, in accordance with an embodiment of the present application.

FIG. 9A depicts an exemplary access control graph (ACG) 900, in accordance with an embodiment of the present application. ACG 900 can include various entities (e.g., users, groups, assigned permissions, actual permissions, and resources) with directed edges (arrows) between them. An index 970 can indicate various relationships between the depicted entities. For example: a thick solid line edge can indicate a membership relation 971 (no cost); a dotted line edge can indicate an allow permission 972 with a cost of "1"; a thick dashed line edge can indicate a deny permission 973 with a cost of "1"; a dotted-dashed line edge can indicate an inherits relation 974 with a cost of "1"; a solid line edge can indicate an implies relation 975 with a cost of "0"; and a dashed-dotted-dotted line edge can indicate an applies relation 976 with a cost of "1."

In ACG 900, a user 902 can be a member of a group 904 (via a membership edge 932). User 902 can also have a deny permission to assigned permission B 912 (via a deny permission edge 946). Group 904 may have an allow permission to assigned permission A 906 (via an allow permission edge 934). Group 904 may also have an allow permission to assigned permission B 922 (via an allow permission edge 956).

Assigned permission A 906 can imply both an actual permission A 908 and an actual permission B 914 (respectively, via implies edges 936 and 938). Assigned permission B 912 can imply actual permission B 914 (via an implies edge 940). Assigned permission A 906 can inherit to an assigned permission A 916 (via an inherits edge 948), and assigned permission A 916 can imply both an actual permission A 918 and an actual permission B 924 (respectively, via implies edges 958 and 960). Assigned permission B 912 can inherit to assigned permission B 922 (via an inherits edge 952), and assigned permission B can imply actual permission B 924 (via an implies edge 962). Furthermore, assigned permission A 916 can inherit to another permission (not shown, via an inherits edge 950) and assigned permission B 922 can also inherit to another permission (not shown, via an inherits edge 954).

Finally, each of the actual permissions can apply to a particular resource. For example: actual permission A 908 applies to resource 910 (via an applies edge 942); actual permission B 914 applies to resource 910 (via an applies edge 944); actual permission A 918 applies to resource 920 (via an applies edge 964); and actual permission B 924 applies to resource 920 (via an applies edge 966).

The system can calculate the actual permission for a {User, Resource} pair based on a graph algorithm which uses a shortest path calculation. The result of the calculation of the actual permission is either allow or deny, i.e., either allow a permission to User on Resource or deny a permission to User on Resource. If a deny path does not exist and an allow path exists, then the result of the calculation is "ALLOW." This can be expressed as:

If Deny path does not exist AND Allow path exists→ALLOW

If a deny path exists, the system determines the cost of each of the deny path and the allow path. If the cost of the deny path is less than or equal to the cost of the allow path, then the result of the calculation is "DENY." If the cost of the deny path is greater than the cost of the allow path, then the result of the calculation is "ALLOW." This can be expressed as:

|Deny path|<=|Allow path|→DENY
|Deny path|>|Allow path|→ALLOW

Figure 9B:
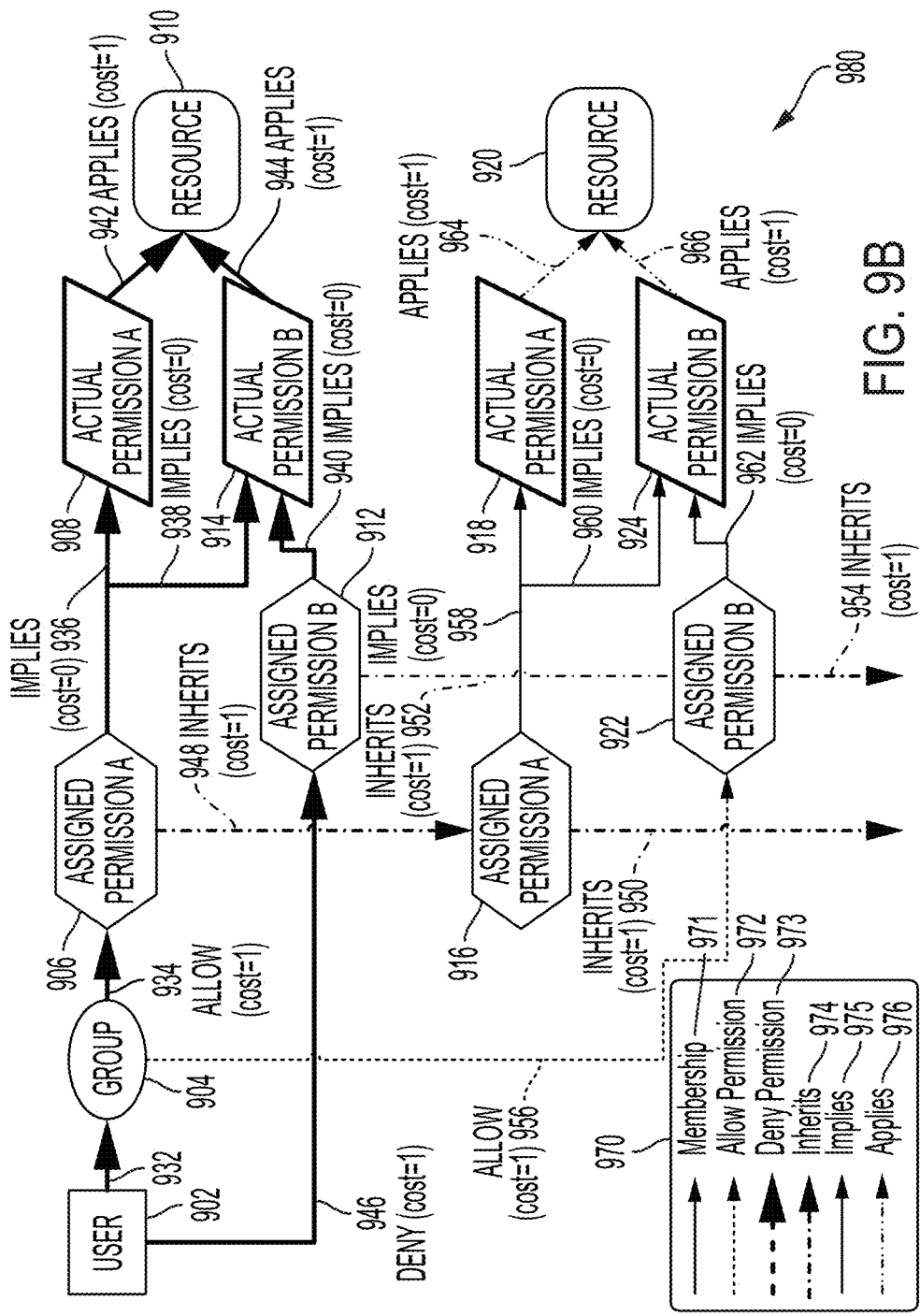
FIG. 9B depicts an exemplary access control graph, including calculating an actual permission via a shortest path, in accordance with an embodiment of the present application.

FIG. 9B depicts an exemplary access control graph (ACG) 980, including calculating an actual permission via a shortest path, in accordance with an embodiment of the present application. ACG 980 corresponds to ACG 900 and includes calculations of allow and deny paths to determine the whether a principal (e.g., a user or a group) has an allow or a deny permission to a particular resource. The calculated allow and deny paths are indicated with thick bold lines. For example, when determining the ALLOW/DENY result of actual permission A 908 for user 902 on resource 910, the system can determine that a deny path from user 902 to resource 910 through actual permission A 908 does not exist. The system can also determine that an allow path does exist from user 902 to resource 910 through actual permission A 908, which has an overall Allow path cost of "2," calculated as follows: user 902 to group 904 has a membership cost of "0" (932); group 904 to assigned permission A 906 has an allow cost of "1" (934); assigned permission A 906 to actual permission A 908 has an implies cost of "0" (936); and actual permission A 908 to resource 910 has an applies cost of "1" (942). Since a deny path does not exist and an allow path does exist, the result is that actual permission A 908 to resource 910 is Allowed to user 902.

As another example, when determining the ALLOW/DENY result of actual permission B 914 for user 902 on resource 910, the system can determine that a deny path from user 902 to resource 910 through actual permission B 914 has an overall deny path cost of "2." This overall deny path cost can be calculated based on the following path: user 902 to assigned permission B 912 has a deny cost of "1" (946); assigned permission B 912 to actual permission B 914 has an implies cost of "0" (940); and actual permission B 914 to resource 910 has an applies cost of "1" (944). The system can also determine that an allow path from user 902 to resource 910 through actual permission B 914 has an overall allow path cost of "2." This overall allow path cost of "2" can be calculated based on the following: user 902 to group 904 has a membership cost of "0" (932); group 904 to assigned permission A 906 has an allow cost of "1" (934); assigned permission A 906 to actual permission B 914 has an implies cost of "0" (938); and actual permission B 914 to resource 910 has an applies cost of "1" (944). Because the overall deny path cost (2) is less than or equal to the overall allow path cost (2), actual permission B 914 to resource 910 is denied to user 902.

Figure 9C:
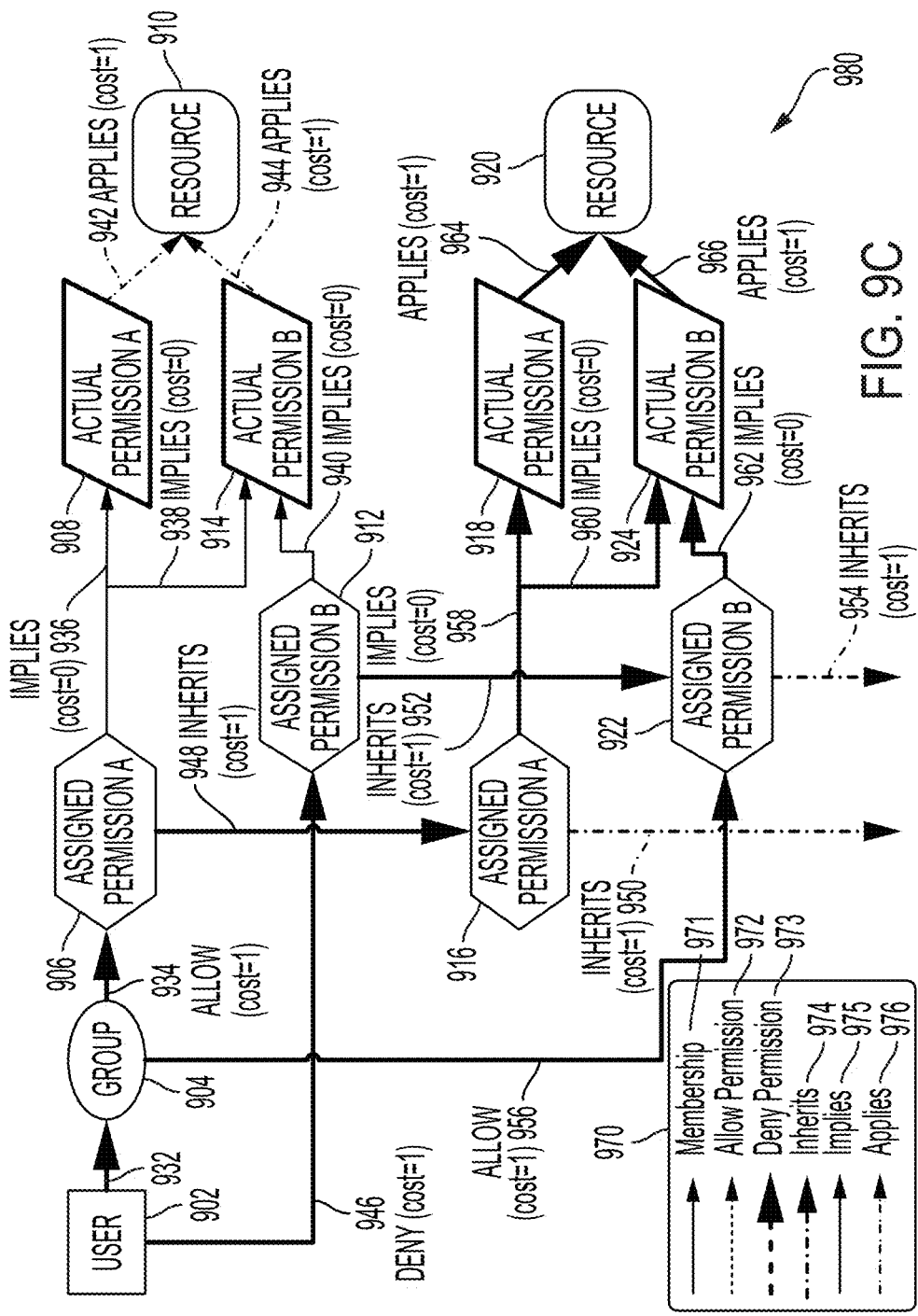
FIG. 9C depicts an exemplary access control graph, including calculating an actual permission via a shortest path, in accordance with an embodiment of the present application.

FIG. 9C depicts an exemplary access control graph (ACG) 990, including calculating an actual permission via a shortest path, in accordance with an embodiment of the present application. ACG 990 corresponds to ACG 900 and includes calculations of allow and deny paths to determine the whether a principal (e.g., a user or a group) has an allow or a deny permission to a particular resource. The calculated allow and deny paths are indicated with thick bold lines. For example, when determining the ALLOW/DENY result of actual permission A 918 for user 902 on resource 920, the system can determine that a deny path from user 902 to resource 920 through actual permission A 918 does not exist. The system can also determine that an allow path does exist from user 902 to resource 920 through actual permission A 918, which has an overall allow path cost of "3," calculated as follows: user 902 to group 904 has a membership cost of "0" (932); group 904 to assigned permission A 906 has an allow cost of "1" (934); assigned permission A 906 to assigned permission A 916 has an inherits cost of "1" (948); assigned permission A 916 to actual permission A 918 has an implies cost of "0" (958); and actual permission A 918 to resource 920 has an applies cost of "1" (964). Since a deny path does not exist and an allow path does exist, the result is that actual permission A 918 to resource 920 is allowed to user 902.

As another example, when determining the ALLOW/DENY result of actual permission B 924 for user 902 on resource 920, the system can determine that a deny path from user 902 to resource 920 through actual permission B 924 has an overall deny path cost of "3." This overall deny path cost can be calculated based on the following path: user 902 to assigned permission B 912 has a deny cost of "1" (946); assigned permission B 912 to assigned permission B 922 has an inherits cost of "1" (952); assigned permission B 922 to actual permission B 924 has an implies cost of "0" (962); and actual permission B 924 to resource 920 has an applies cost of "1" (966). The system can also determine that an allow path from user 902 to resource 910 through actual permission B 914 has an overall Allow path cost of "2." This overall allow path cost of "2" can be calculated based on the following: user 902 to group 904 has a membership cost of "0" (932); group 904 to assigned permission B 922 has an allow cost of "1" (956); assigned permission B 922 to actual permission B 924 has an implies cost of "0" (962); and actual permission B 924 to resource 920 has an applies cost of "1" (966). Because the overall deny path cost (3) is not less than or equal to the overall allow path cost (2), actual permission B 924 to resource 920 is allowed to user 902.

Thus, the calculations of the shortest paths depicted and described above in ACGs 980 and 990 illustrate that the system must examine the lengths of the shortest Deny path and the shortest Allow Path which go through a given actual permission node. In some embodiments, because the applies cost from an actual permission node to a resource is always 1, the shortest path calculation can be performed only from a user node to an actual permission node.

Thus, the domain graph is generated based on the policy file and subsequently trimmed based on user-specified policies and rules, and the access control graph is generated based on the scenario file and further based on the user-specified capability assignments. If any conflicts arise between the policy file and the scenario file, the SCIBORG system can return an unsatisfiable (unsat) core, e.g., if the solver component cannot resolve two contradictory statements such as: a) user U has an allow permission to resource R1; and b) user U has a deny permission to resource R1. The system can also examine functional requirements in the scenario file to resolve conflicts, e.g., by determining whether certain constraints are relaxable and can thus be removed or overridden. For example, a relaxable allow permission in an underlying input file can be interpreted as an allow in the ACG, while a non-relaxable deny permission in an underlying input file can be treated as a functional non-relaxable constraint to be solved by the overall system (i.e., SCIBORG).

As described herein, the system can use the domain graph and the access control graph to address the issues related to generating the first order logic for all possibilities of FIGS. 5A and 5B. The domain graph can work on structural features of the system, as depicted in the upper portions of FIGS. 5A and 5B. The domain graph can limit which users can be assigned allow permissions to which resources, which groups can include which other groups, and which users can be assigned to which groups. The access control graph can determine the actual bits in the effective permissions vectors, as depicted in the lower portions of FIGS. 5A and 5B (e.g., permission vectors 560). The access control graph can evaluate the shortest path relationships on each pair of {User, actual permission on R}, using the graph algorithm, as described above in relation to FIGS. 9B and 9C.

Path Requirements

The prior sections describe back-tracking rules that go from effective rights to assigned rights. The system can also have an assignment of user/group M permission P to a resource (or a deny of the same). The section entitled "How to Model a Group Membership" along with the below section describes the ways in which a user can obtain those rights through group memberships.

The domain graph can be a weighted directed simple graph and can contain, include, or indicate all the allowable paths from users to resources. These paths can conform to the domain trust and operator policies. While the system may use the domain graph to generate these paths, instead the system uses a cache of all paths used by the Operational Requirements, Inheritance, and Access Control Entry Requirements. This can eliminate undue path expansion: if a path was not used by any of those three requirements, then it is not a valid choice for the Reasoner.

For every assignment (U,P), where U is specifically a User not a group, to a resource R, the system can write predicates that state that if U is a member of the expanded local allow/deny, then there must be some path from U to that resource, where the terminal user/group of the path is assigned that permission. The user/group could also be assigned a permission that implies P, where (path i) is one possible way the user U can reach R directly or via group memberships.

The paths can be tied to the expanded local allow (LA) and local deny (LD). The LA and LD require a direct assignment at that point, which means there must be a path from the user to that particular ACL.

Paths may also be used to compute the effective group memberships. Recall that each group (parameter domain-.group) has an expanded membership parameter (domain-.group_exp). The expanded membership parameter can take into account the transitive nesting of group memberships based on which paths are enabled.

For a (path i)=u->g0->g1->g2, write an implication that for all the effective group memberships: g2_eff1=(u, g0, g1), g1_eff1=(g0, u), and g0_eff1=(u). These will take the following form:
(=>(path i0) (and (member u g2_eff) (member g0 g2_eff) (member g1 g2_eff)))
(=>(path i1) (and (member u g1_eff) (member g0 g1_eff)))
(=>(path i2) (and (member u g0_eff)))

1. Expand paths:
   For every (path i), expand it to a first hop and the group-group tail (if it exists). U is a user object and G is a group object. (path j) is a subpath that begins at G and ends just before a resource. The paths are generated by finding paths (U,R) from a user to a resource, but the expansion is only among the principals U and G, which form group memberships. The last-hop is a separate set of assertions about permissions handled in #2 below:

(assert (= (path i) (member U G))
   or
   (assert (= (path i) (and (member U G) (path j))).
   -- The same assertion can be made for the sub-path (path j), where the subpath is only group-group memberships.

2. Soft deny paths: Soft deny every role subpath with the weight of the path:
   (assert-soft (not (path N)) :weight W).

3. Group expansion:

-- For every path, write a set of functional requirement implications for the
   effective group memberships, as above:
   (assert (= (member M G_exp)
       (or
           (member M G)
           (and (member M G1) (member G1 G))
           ...))).
   -- An expanded group should never contain its unexpanded group (i.e. (not (member G G_exp))).
   -- If a group is empty, its expanded group must be empty:
   (assert (=> (= G_as_membership empty)
       (= G_exp_as_membership empty))).
   -- An expanded group must be a superset of the unexpanded group. If the group is empty, then the expansion must be empty too:
   (assert (ite (= G_members empty)
       (= G_exp empty)
       (member G_as_membership G_exp))),
   where G_members is the Parameter G, not the token G.

Method for Facilitating Synthesizing RBAC Assignments Per a Policy

Figure 10A:
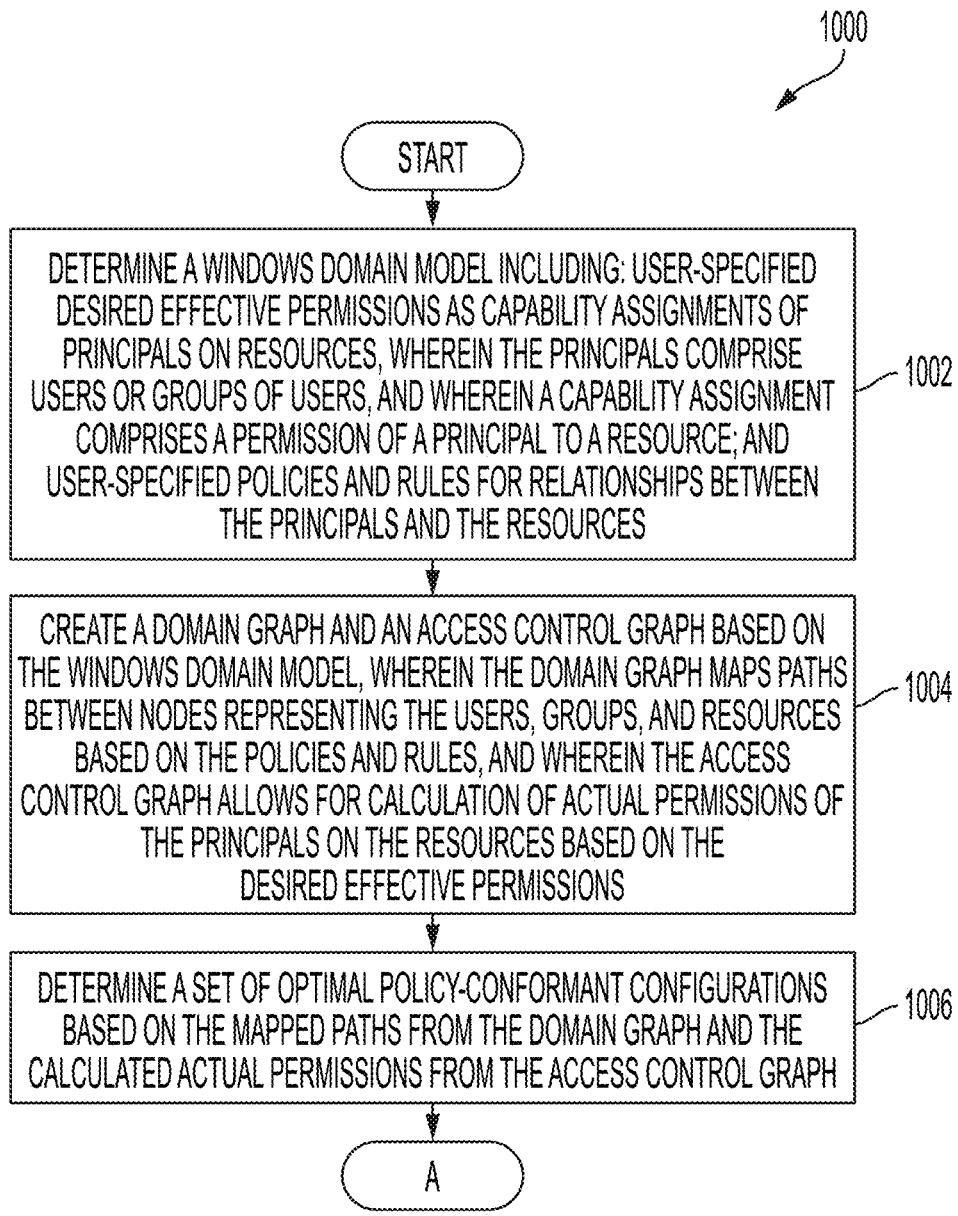
FIG. 10A presents a flow chart illustrating a method which facilitates synthesizing RBAC assignments per a policy, in accordance with an embodiment of the present application.

FIG. 10A presents a flow chart 1000 illustrating a method which facilitates synthesizing RBAC assignments per a policy, in accordance with an embodiment of the present application. During operation, the system determines a Windows domain model including: user-specified desired effective permissions as capability assignments of principals on resources, wherein the principals comprises users or groups of users, and wherein a capability assignment comprises a permission of a principal to a resource; and user-specified policies and rules for relationships between the principals and the resources (operation 1002). The system creates a domain graph and an access control graph based on the Windows domain model, wherein the domain graph maps paths between nodes representing the users, groups, and resources based on the policies and rules, and wherein the access control graph allows for calculation of actual permissions of the principals on the resources based on the desired effective permissions (operation 1004). The system determines a set of optimal policy-conformant configurations based on the mapped paths from the domain graph and the calculated actual permissions from the access control graph (operation 1006). In determining the set of policy-conformant configurations, the system can determine actual permissions (i.e., access control entries) for the respective principal to the respective resource and group memberships indicating which users belong to which groups. The operation continues at Label A of FIG. 10B.

Figure 10B:
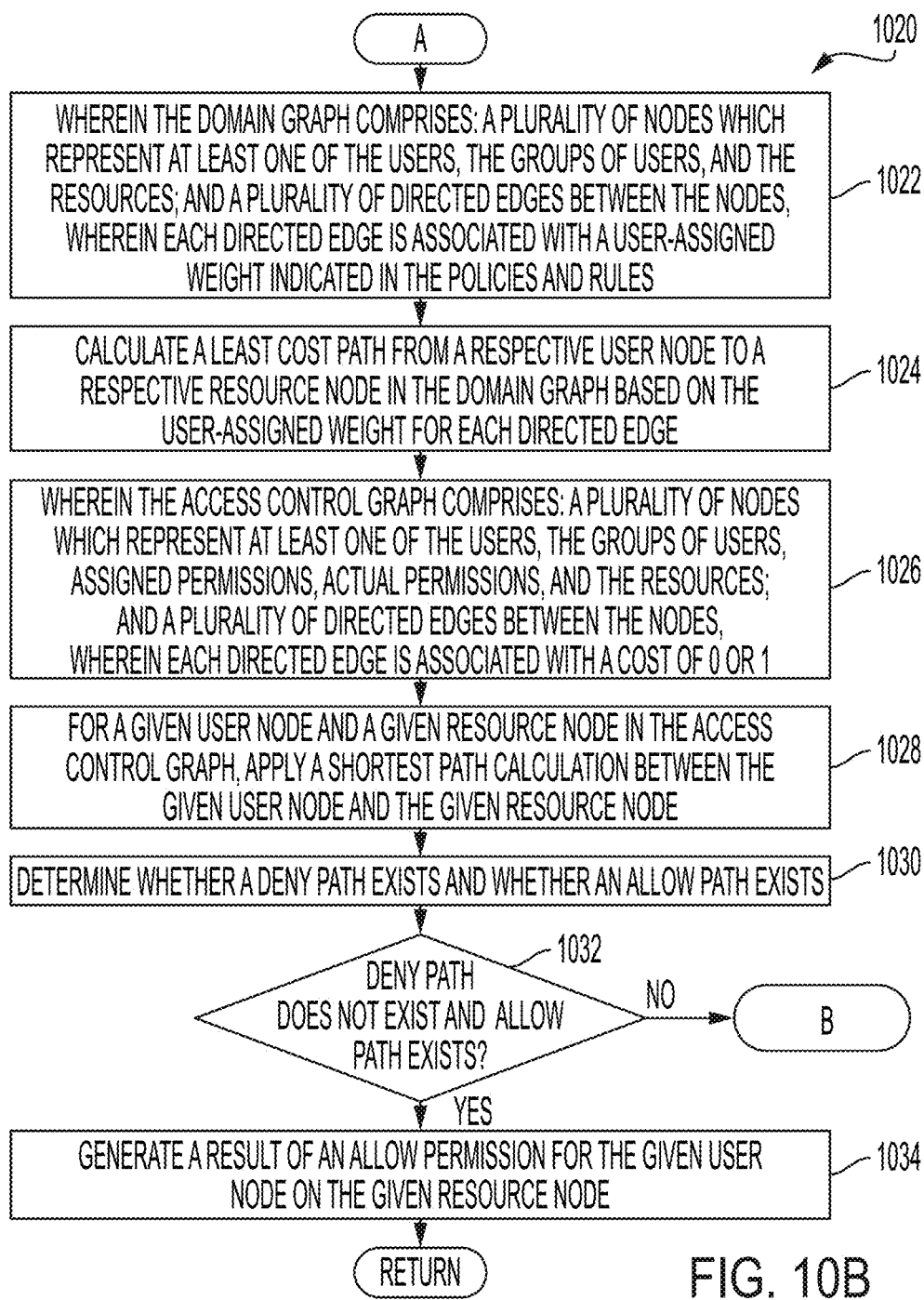
FIG. 10B presents a flow chart illustrating a method which facilitates synthesizing RBAC assignments per a policy, in accordance with an embodiment of the present application.

FIG. 10B presents a flow chart 1020 illustrating a method which facilitates synthesizing RBAC assignments per a policy, in accordance with an embodiment of the present application. The domain graph comprises: a plurality of nodes which represent at least one of the users, the groups of users, and the resources; and a plurality of directed edges between the nodes, wherein each directed edge is associated with a user-assigned weight indicated in the policies and rules (operation 1022). The system calculates a least cost path from a respective user node to a respective resource node in the domain graph based on the user-assigned weight for each directed edge (operation 1024). The access control graph comprises: a plurality of nodes which represent at least one of the users, the groups of users, assigned permissions, actual permissions, and the resources; and a plurality of directed edges between the nodes, wherein each directed edge is associated with a cost of 0 or 1 (operation 1026). For a given user node and a given resource node, the system applies a shortest path calculation between the given user node and the given resource node (operation 1028), by performing operations 1032, 1034 and the operations depicted in FIG. 10C.

The system determines whether a deny path exists and whether an allow path exists (operation 1030). If the deny path does not exist and the allow path does exist (decision 1032), the system generates a result of an allow permission for the given user node on the given resource node (operation 1034). Otherwise, the operation continues at Label B of FIG. 10C.

Figure 10C:
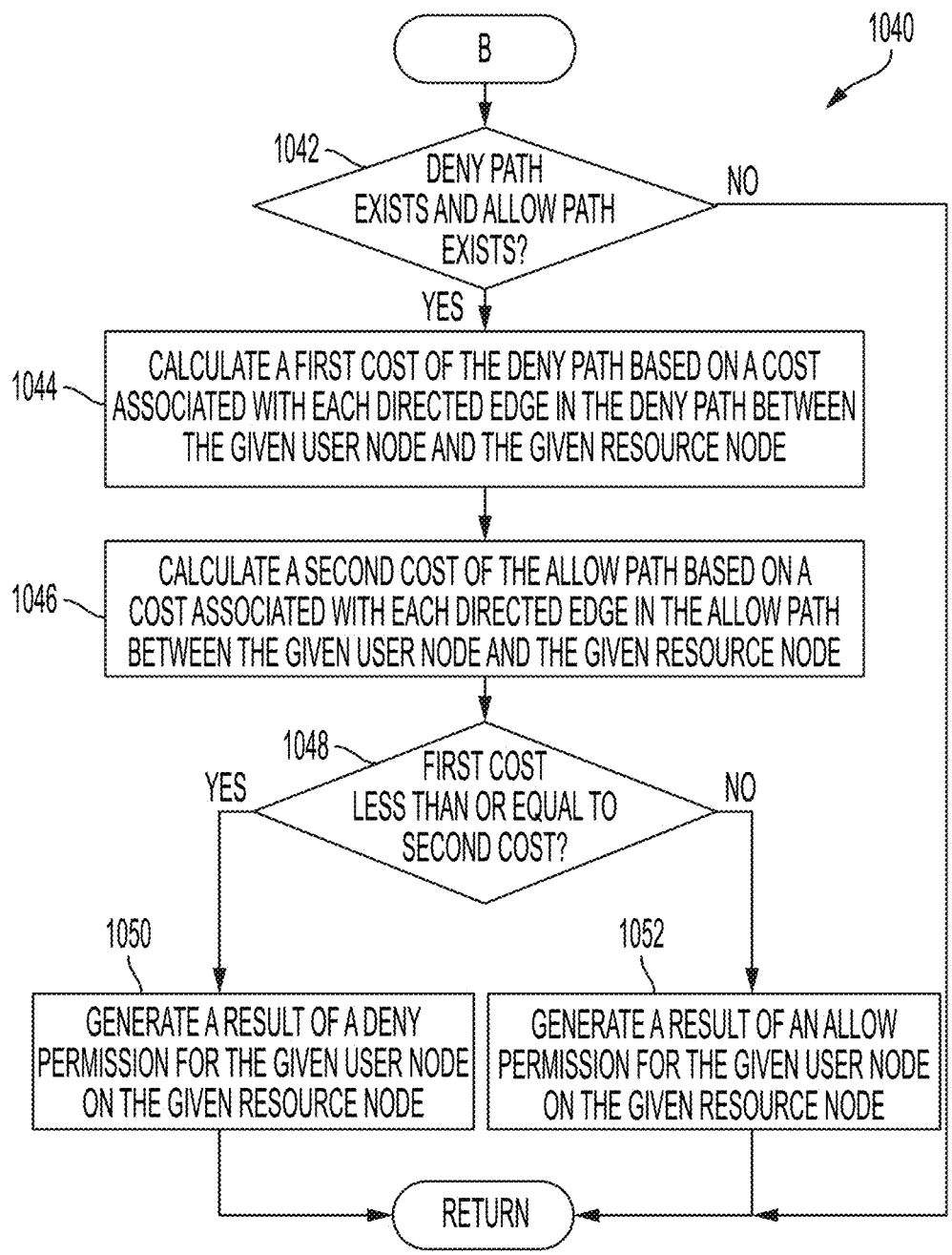
FIG. 10C presents a flow chart illustrating a method which facilitates synthesizing RBAC assignments per a policy, in accordance with an embodiment of the present application.

FIG. 10C presents a flow chart 1040 illustrating a method which facilitates synthesizing RBAC assignments per a policy, in accordance with an embodiment of the present application. If the deny path and the allow path does not exist (decision 1042), the operation returns. If the deny path does exist and the allow path does exist (decision 1042), the system performs the following operations. The system calculates a first cost of the deny path based on a cost associated with each directed edge in the deny path between the given user node and the given resource node (operation 1044). The system calculates a second cost of the allow path based on a cost associated with each directed edge in the allow path between the given user node and the given resource node (operation 1046). If the first cost is less than or equal to the second cost (decision 1048), the system generates a result of a deny permission for the given user node on the given resource node (operation 1050). If the first cost is not less than or equal to (i.e., is greater than) the second cost (decision 1048), the system generates a result of an allow permission for the given user node on the given resource node (operation 1052).

Exemplary Computer and Communication System

Figure 11:
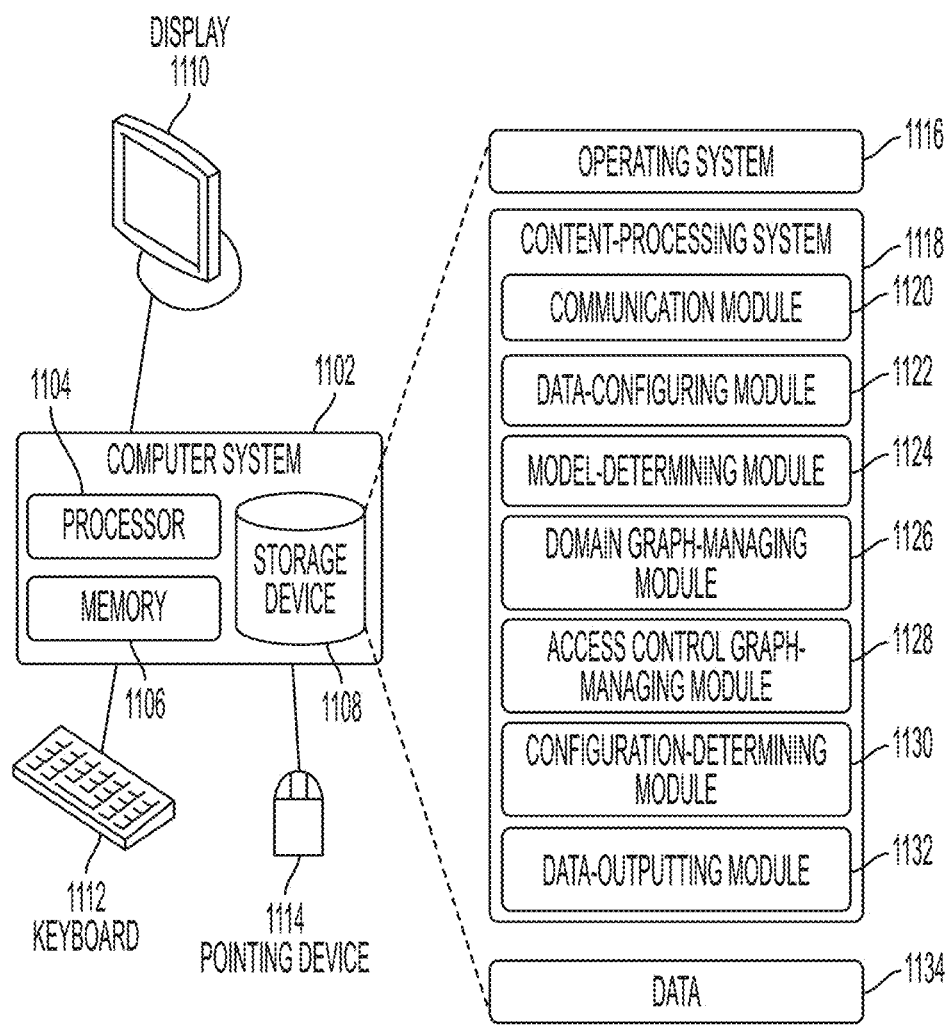
FIG. 11 illustrates an exemplary computer and communication system that facilitates synthesizing RBAC assignments per a policy, in accordance with an embodiment of the present application.

FIG. 11 illustrates an exemplary computer and communication system 1102 that facilitates synthesizing RBAC assignments per a policy, in accordance with an embodiment of the present application. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store an operating system 1116, a content-processing system 1118, and data 1134.

Content-processing system 1118 can include instructions, which when executed by computer system 1102, can cause computer system 1102 to perform methods and/or processes described in this disclosure. Specifically, content-processing system 1118 may include instructions for sending and/or receiving data packets to/from other network nodes across a computer network (communication module 1120).

Content-processing system 1118 can further include instructions for determining a Windows domain model including: user-specified desired effective permissions as capability assignments of principals on resources, wherein the principals comprises users or groups of users, and wherein a capability assignment comprises a permission of a principal to a resource; and user-specified policies and rules for relationships between the principals and the resources (data-configuring model 1122 and model-determining model 1124). Content-processing system 1118 can include instructions for creating a domain graph and an access control graph based on the Windows domain model, wherein the domain graph maps paths between nodes representing the users, groups, and resources based on the policies and rules (domain graph-managing module 1126), and wherein the access control graph allows for calculation of actual permissions of the principals on the resources based on the desired effective permissions (access control graph-managing module 1128). Content-processing system 1118 can also include instructions for determining a set of optimal policy-conformant configurations based on the mapped paths from the domain graph and the calculated actual permissions from the access control graph (configuration-determining module 1130).

Content-processing system 1118 can additionally include instructions for calculating a least cost path from a respective user node to a respective resource node in the domain graph based on the user-assigned weight for each directed edge (domain graph-managing module 1126 and configuration-determining module 1130). Content-processing system 1118 can include instructions for applying a shortest path calculation between the given user node and the given resource node (access control graph-managing module 1128 and configuration-determining module 1130). Content-processing system 1118 can further include instructions for generating a multi-layer graph and applying a process on the multi-layer graph to obtain a recommended configuration, wherein the process applies operational and security constraints to the multi-layer graph (configuration-determining module 1130). Content-processing system 1118 can include instructions for generating, based on the recommended configuration, a report (data-outputting module 1132).

Data 1134 can include any data that is required as input or that is generated as output by the methods and/or processes described in this disclosure. Specifically, data 934 can store at least: a model; a domain model; a Windows domain model; a desired effective permission; a user-specified effective permission; a capability assignment; an indicator of a principal, user, group, or resource; a group membership; an actual permission; an access control entry; a policy; a rule; a user-specified policy or rule; a scenario file; a policy file; a domain graph; a node; a path; a directed edge; an edge which indicates an intra-domain membership relation, an inter-domain membership relation, a intra-domain permission relation, an inter-domain permission relation, or an inheritance relation; a weight; a user-assigned weight; a least cost path; a calculation of a least cost path; an access control graph; an edge which indicates a membership relation, an allow or deny permission relation, an implies relation, an applies relation, an inherits relation; a cost associated with an edge in an access control graph; a calculation; a shortest path calculation; a cost of a deny path; a cost of an allow path; a set of configurations; a set of optimal policy-conformant configurations; ingested input files; a JSON-formatted file; a multi-layer graph; an operational or security constraint; a relaxable constraint; and a report.

Figure 12:
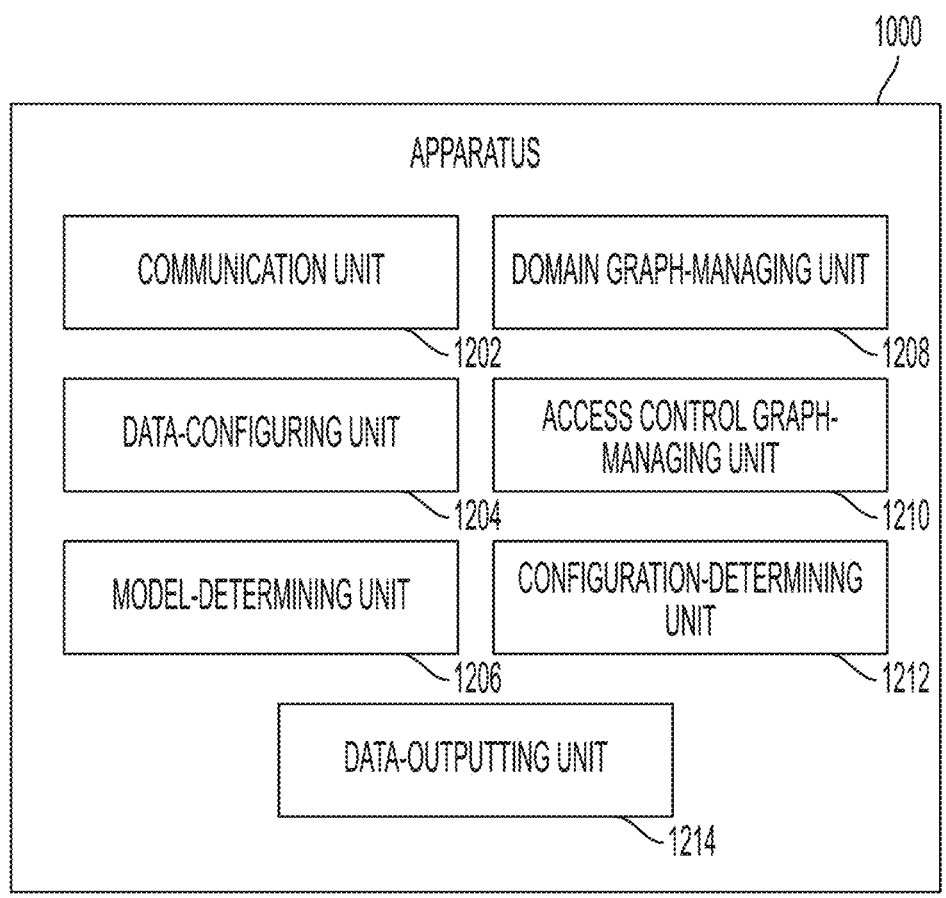
FIG. 12 illustrates an exemplary apparatus that facilitates synthesizing RBAC assignments per a policy, in accordance with an embodiment of the present application.

FIG. 12 illustrates an exemplary apparatus 1200 that facilitates synthesizing RBAC assignments per a policy, in accordance with an embodiment of the present application. Apparatus 1200 can comprise a plurality of units or apparatuses which may communicate with one another via a wired, wireless, quantum light, or electrical communication channel. Apparatus 1200 may be realized using one or more integrated circuits, and may include fewer or more units or apparatuses than those shown in FIG. 12. Further, apparatus 1200 may be integrated in a computer system, or realized as a separate device which is capable of communicating with other computer systems and/or devices. Specifically, apparatus 1200 can comprise units 1202-1214 which perform functions or operations similar to modules 1120-1132 of computer system 1102 of FIG. 11, including: a communication unit 1202; a data-configuring unit 1204; a model-determining unit 1206; a domain graph-managing unit 1208; an access control-graph managing unit 1210; a configuration-determining unit 1212; a data-outputting unit 1214.

Thus, the described embodiments (e.g., the SCIBORG RBAC Model and the solver) can encode the behavior of the common RBAC access control model to facilitate secure Windows discretionary access control, and can further apply the encoded behavior to systems like Windows Active Directory, NTFS file systems, and Windows Registries. In addition, the described embodiments can be applied to other areas of Windows that use access control, e.g., files, directories, mail slots, named pipes, processes, threads, access tokens, file-mapping objects, semaphores, events, mutexes, waitable timers, window stations, desktops, registry keys, windows service objects, printer objects, network shares, private objects.

The described embodiments may also be applied to many different fields other than Windows access control. One such field is cloud security, e.g., AWS or Azure, which are both based on RBAC. The described embodiments can also apply to Mandatory Access Control and Discretionary Access Control, as all the permissions are defined as data and not hard-coded into the model. The described system can also be used to model operating system security systems, e.g., SELinux or AppArmor. A wide variety of modern software which uses access control can benefit from the described embodiments.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
 determining a Windows domain model including:
  user-specified desired effective permissions as capability assignments of principals on resources, wherein the principals comprises users or groups of users, wherein a capability assignment comprises a permission of a principal to a resource, and wherein the user-specified desired effective permissions are included in a scenario file; and
  user-specified policies and rules for relationships between the principals and the resources, wherein the user-specified policies and rules are included in a policy file;
 creating a domain graph and an access control graph based on the Windows domain model by transmitting, to a python role-based access control (RBAC) module, the scenario file, the policy file, and other input files describing the Windows domain model for processing,
  wherein the domain graph maps paths between nodes representing the users, groups, and resources based on the policies and rules, and
  wherein the access control graph allows for calculation of actual permissions of the principals on the resources based on the desired effective permissions;
 generating a multi-layer graph by determining a set of optimal configurations which conform to a policy based on the mapped paths from the domain graph and the calculated actual permissions from the access control graph;
 applying a process on the multi-layer graph to obtain a recommended configuration, wherein the process applies operational and security constraints to the multi-layer graph; and
 generating, based on the recommended configuration, a report comprising at least one of:
  choices made by the system in selecting the recommended configuration, including prioritization of a first constraint over a second constraint;
  a description of capabilities assigned to users and resources; and
  a description of group memberships.

2. The computer-implemented method of claim 1,
 wherein the domain graph comprises: a plurality of nodes which represent at least one of the users, the groups of users, and the resources; and a plurality of directed edges between the nodes,
 wherein a first directed edge from a respective user or a first group in a first domain to a second group in the first domain indicates an intra-domain membership relation,
 wherein a second directed edge from the respective user or the first group in the first domain to a third group in a second domain indicates an inter-domain membership relation,
 wherein a third directed edge from the respective user or the first group in the first domain to a first resource in the first domain indicates an intra-domain permission relation,
 wherein a fourth directed edge from the respective user or the first group in the first domain to a second resource in the second domain indicates an inter-domain permission relation, and
 wherein a fifth directed edge from the first resource in the first domain to a third resource indicates an inheritance relation which comprises inheriting a characteristic from another node in the domain graph.

3. The computer-implemented method of claim 2,
wherein each directed edge is associated with a user-assigned weight indicated in the policies and rules, and
wherein determining the set of optimal configurations which conform to the policy based on the mapped paths from the domain graph further comprises calculating a path associated with a least coast from a respective user node to a respective resource node in the domain graph based on the user-assigned weight for each directed edge.

4. The computer-implemented method of claim 1,
wherein the access control graph comprises: a plurality of nodes which represent at least one of the users, the groups of users, assigned permissions, actual permissions, and the resources; and a plurality of directed edges between the nodes,
wherein a first directed edge from a respective user or a first group to a second group indicates a membership relation,
wherein a second directed edge from the respective user or the first group to a first assigned permission indicates an allow or deny permission relation,
wherein a third directed edge from the first assigned permission to an actual permission indicates an implies relation,
wherein a fourth directed edge from the actual permission to a first resource indicates an applies relation, and
wherein a fifth directed edge from the first assigned permission to a second assigned permission indicates an inherits relation which comprises inheriting a permission from another node in the access control graph.

5. The computer-implemented method of claim 4,
wherein a cost associated with an edge and comprising a value of zero is associated with each of:
  the first directed edge indicating the membership relation; and
  the third directed edge indicating the implies relation; and
wherein a cost of 1 is associated with each of:
  the second directed edge indicating the allow or deny permission relation;
  the fourth directed edge indicating the applies relation; and
  the fifth directed edge indicating the inherits relation.

6. The computer-implemented method of claim 5, wherein determining the set of optimal configurations which conform to the policy based on the calculated actual permissions from the access control graph further comprises:
  for a given user node and a given resource node, applying a shortest path calculation between the given user node and the given resource node, by:
    determining whether a deny path exists;
    determining whether an allow path exists; and
  responsive to determining that the deny path does not exist and the allow path does exist, generating a result of an allow permission for the given user node on the given resource node.

7. The computer-implemented method of claim 6, further comprising:
  responsive to determining that the deny path does exist and the allow path does exist:
    calculating a first cost associated with the deny path based on a cost associated with each directed edge in the deny path between the given user node and the given resource node;
    calculating a second cost associated with the allow path based on a cost associated with each directed edge in the allow path between the given user node and the given resource node;
    responsive to the first cost being less than or equal to the second cost, generating a result of a deny permission for the given user node on the given resource node; and
    responsive to the first cost being greater than the second cost, generating a result of an allow permission for the given user node on the given resource node.

8. The computer-implemented method of claim 1,
wherein the set of optimal configurations which conform to the policy comprise access control entries for the respective principal to the respective resource and group memberships indicating which users belong to which groups.

9. A computer system, comprising:
a processor; and
a storage device storing instructions that when executed by the processor cause the processor to perform a method, the method comprising:
determining a Windows domain model including:
  user-specified desired effective permissions as capability assignments of principals on resources, wherein the principals comprises users or groups of users, and wherein a capability assignment comprises a permission of a principal to a resource, and wherein the user-specified desired effective permissions are included in a scenario file; and
  user-specified policies and rules for relationships between the principals and the resources, wherein the user-specified policies and rules are included in a policy file;
creating a domain graph and an access control graph based on the Windows domain model by transmitting, to a python role-based access control (RBAC) module, the scenario file, the policy file, and other input files describing the Windows domain model for processing,
  wherein the domain graph maps paths between nodes representing the users, groups, and resources based on the policies and rules, and
  wherein the access control graph allows for calculation of actual permissions of the principals on the resources based on the desired effective permissions; and
generating a multi-layer graph by determining a set of optimal configurations which conform to a policy based on the mapped paths from the domain graph and the calculated actual permissions from the access control graph;
applying a process on the multi-layer graph to obtain a recommended configuration, wherein the process applies operational and security constraints to the multi-layer graph; and
generating, based on the recommended configuration, a report comprising at least one of:
  choices made by the system in selecting the recommended configuration, including prioritization of a first constraint over a second constraint;
  a description of capabilities assigned to users and resources; and
  a description of group memberships.

10. The computer system of claim 9,
wherein the domain graph comprises: a plurality of nodes which represent at least one of the users, the groups of users, and the resources; and a plurality of directed edges between the nodes,
wherein a first directed edge from a respective user or a first group in a first domain to a second group in the first domain indicates an intra-domain membership relation,
wherein a second directed edge from the respective user or the first group in the first domain to a third group in a second domain indicates an inter-domain membership relation,
wherein a third directed edge from the respective user or the first group in the first domain to a first resource in the first domain indicates an intra-domain permission relation,
wherein a fourth directed edge from the respective user or the first group in the first domain to a second resource in the second domain indicates an inter-domain permission relation, and
wherein a fifth directed edge from the first resource in the first domain to a third resource indicates an inheritance relation which comprises inheriting a characteristic from another node in the domain graph.

11. The computer system of claim 10,
wherein each directed edge is associated with a user-assigned weight indicated in the policies and rules, and
wherein determining the set of optimal configurations which conform to the policy based on the mapped paths from the domain graph further comprises calculating a path associated with a least cost from a respective user node to a respective resource node in the domain graph based on the user-assigned weight for each directed edge.

12. The computer system of claim 9,
wherein the access control graph comprises: a plurality of nodes which represent at least one of the users, the groups of users, assigned permissions, actual permissions, and the resources; and a plurality of directed edges between the nodes,
wherein a first directed edge from a respective user or a first group to a second group indicates a membership relation,
wherein a second directed edge from the respective user or the first group to a first assigned permission indicates an allow or deny permission relation,
wherein a third directed edge from the first assigned permission to an actual permission indicates an implies relation,
wherein a fourth directed edge from the actual permission to a first resource indicates an applies relation, and
wherein a fifth directed edge from the first assigned permission to a second assigned permission indicates an inherits relation which comprises inheriting a permission from another node in the access control graph.

13. The computer system of claim 12,
wherein a cost associated with an edge and comprising a value of zero is associated with each of:
 the first directed edge indicating the membership relation; and
 the third directed edge indicating the implies relation; and
wherein a cost of 1 is associated with each of:
 the second directed edge indicating the allow or deny permission relation;
 the fourth directed edge indicating the applies relation; and
 the fifth directed edge indicating the inherits relation.

14. The computer system of claim 13, wherein determining the set of optimal configurations which conform to the policy based on the calculated actual permissions from the access control graph further comprises:
for a given user node and a given resource node, applying a shortest path calculation between the given user node and the given resource node, by:
 determining whether a deny path exists;
 determining whether an allow path exists;
 responsive to determining that the deny path does not exist and the allow path does exist, generating a result of an allow permission for the given user node on the given resource node;
 responsive to determining that the deny path does exist and the allow path does exist:
  calculating a first cost associated with the deny path based on a cost associated with each directed edge in the deny path between the given user node and the given resource node;
  calculating a second cost associated with the allow path based on a cost associated with each directed edge in the allow path between the given user node and the given resource node;
  responsive to the first cost being less than or equal to the second cost, generating a result of a deny permission for the given user node on the given resource node; and
  responsive to the first cost being greater than the second cost, generating a result of an allow permission for the given user node on the given resource node.

15. The computer system of claim 9,
wherein the set of optimal configurations which conform to the policy comprise access control entries for the respective principal to the respective resource and group memberships indicating which users belong to which groups.

16. A non-transitory computer-readable storage medium storing instructions that when executed by a computer cause the computer to perform a method, the method comprising:
determining a Windows domain model including:
 user-specified desired effective permissions as capability assignments of principals on resources, wherein the principals comprises users or groups of users, wherein a capability assignment comprises a permission of a principal to a resource, and wherein the user-specified desired effective permissions are included in a scenario file; and
 user-specified policies and rules for relationships between the principals and the resources, wherein the user-specified policies and rules are included in a policy file;
creating a domain graph and an access control graph based on the Windows domain model by transmitting, to a python role-based access control (RBAC) module, the scenario file, the policy file, and other input files describing the Windows domain model for processing,
 wherein the domain graph maps paths between nodes representing the users, groups, and resources based on the policies and rules, and
 wherein the access control graph allows for calculation of actual permissions of the principals on the resources based on the desired effective permissions;
generating a multi-layer graph by determining a set of optimal configurations which conform to a policy based on the mapped paths from the domain graph and the calculated actual permissions from the access control graph;

applying a process on the multi-layer graph to obtain a recommended configuration, wherein the process applies operational and security constraints to the multi-layer graph; and generating, based on the recommended configuration, a report comprising at least one of:
 choices made by the system in selecting the recommended configuration, including prioritization of a first constraint over a second constraint;
  a description of capabilities assigned to users and resources; and
  a description of group memberships.

17. The non-transitory computer-readable storage medium of claim 16, wherein the domain graph comprises: a plurality of nodes which represent at least one of the users, the groups of users, and the resources; and a plurality of directed edges between the nodes, wherein the directed edges indicate at least one of an intra-domain membership relation, an inter-domain membership relation, an intra-domain permission relation, an inter-domain permission relation, and an inheritance relation which comprises inheriting a characteristic from another node in the domain graph, wherein each directed edge is associated with a user-assigned weight indicated in the policies and rules, and wherein determining the set of optimal configurations which conform to the policy based on the mapped paths from the domain graph further comprises calculating a path associated with a least cost from a respective user node to a respective resource node in the domain graph based on the user-assigned weight for each directed edge.

18. The non-transitory computer-readable storage medium of claim 16, wherein the access control graph comprises: a plurality of nodes which represent at least one of the users, the groups of users, assigned permissions, actual permissions, and the resources; and a plurality of directed edges between the nodes, wherein the directed edges indicate at least one of a membership relation, an allow or deny permission relation, an implies relation, an applies relation, and an inherits relation which comprises inheriting a permission from another node in the access control graph, wherein each directed edge is associated with a cost comprising a value of zero or one, and wherein determining the set of optimal policy-conformant configurations based on the calculated actual permissions from the access control graph further comprises:
 for a given user node and a given resource node,
  applying a shortest path calculation between the given user node and the given resource node, by:
  determining whether a deny path exists;
  determining whether an allow path exists; and
  responsive to determining that the deny path does not exist and the allow path does exist, generating a result of an allow permission for the given user node on the given resource node;
  responsive to determining that the deny path does exist and the allow path does exist:
   calculating a first cost of associated with the deny path based on a cost associated with each directed edge in the deny path between the given user node and the given resource node;
   calculating a second cost associated with the allow path based on a cost associated with each directed edge in the allow path between the given user node and the given resource node;
   responsive to the first cost being less than or equal to the second cost, generating a result of a deny permission for the given user node on the given resource node; and
 responsive to the first cost being greater than the second cost, generating a result of an allow permission for the given user node on the given resource node.

* * * * *